(12) United States Patent
Chung

(10) Patent No.: US 11,818,439 B2
(45) Date of Patent: *Nov. 14, 2023

(54) METHODS AND SYSTEMS FOR RECOMMENDING TO A FIRST USER MEDIA ASSETS FOR INCLUSION IN A PLAYLIST FOR A SECOND USER BASED ON THE SECOND USER'S VIEWING ACTIVITY

(71) Applicant: Rovi Guides, Inc., San Jose, CA (US)

(72) Inventor: David D. Chung, Walnut Creek, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/942,341

(22) Filed: Sep. 12, 2022

(65) Prior Publication Data

US 2023/0007358 A1  Jan. 5, 2023

Related U.S. Application Data

(63) Continuation of application No. 16/889,162, filed on Jun. 1, 2020, now Pat. No. 11,477,535, which is a (Continued)

(51) Int. Cl.
*H04N 21/482* (2011.01)
*G06Q 30/0251* (2023.01)
(Continued)

(52) U.S. Cl.
CPC ....... *H04N 21/4826* (2013.01); *G06Q 10/101* (2013.01); *G06Q 30/0269* (2013.01);
(Continued)

(58) Field of Classification Search
CPC .......... H04N 21/4826; H04N 21/4821; H04N 21/4668; H04N 21/4532; H04N 21/4825;
(Continued)

(56) References Cited

U.S. PATENT DOCUMENTS 6,239,794 B1   5/2001 Yuen et al.
6,388,714 B1   5/2002 Schein et al.
(Continued)

FOREIGN PATENT DOCUMENTS

AU   2013204458 A1   5/2013
CN   101061713 A   10/2007
(Continued)

*Primary Examiner* — Yassin Alata
(74) *Attorney, Agent, or Firm* — HALEY GUILIANO LLP

(57) ABSTRACT

Systems and methods for providing a first user with recommendations of media assets for inclusion in a playlist for a second user based on the second user's viewing activity. These systems and methods receive, from the second user, an expression of disinterest in a media asset included in the playlist for the second user, update a user profile associated with the second user based on the expression of disinterest, and determine a recommendation for another media asset based on the updated user profile associated with the second user. The systems and methods provide the recommendation to the first user. By recommending media assets that the second user is least likely to object to, these systems and methods reduce the frequency of disruptive requests for media assets from the second user.

20 Claims, 9 Drawing Sheets

Related U.S. Application Data continuation of application No. 15/188,562, filed on Jun. 21, 2016, now Pat. No. 10,708,664.

(51) Int. Cl.

| | | |
|---|---|---|
| *G06Q 10/101* | (2023.01) | |
| *G06Q 50/00* | (2012.01) | |
| *G06Q 30/0282* | (2023.01) | |
| *H04N 21/442* | (2011.01) | |
| *H04N 21/431* | (2011.01) | |
| *H04N 21/45* | (2011.01) | |
| *H04N 21/466* | (2011.01) | |

(52) U.S. Cl.
CPC ......... *G06Q 30/0282* (2013.01); *G06Q 50/00* (2013.01); *H04N 21/431* (2013.01); *H04N 21/44226* (2020.08); *H04N 21/4532* (2013.01); *H04N 21/4668* (2013.01); *H04N 21/4821* (2013.01); *H04N 21/4825* (2013.01)

(58) Field of Classification Search
CPC ........... H04N 21/431; H04N 21/44222; G06Q 30/0269; G06Q 30/0282; G06Q 10/101; G06Q 50/00
See application file for complete search history.

(56) References Cited

U.S. PATENT DOCUMENTS

| | | | |
|---|---|---|---|
| 6,564,378 | B1 | 5/2003 | Satterfield et al. |
| 6,756,997 | B1 | 6/2004 | Ward et al. |
| 7,165,098 | B1 | 1/2007 | Boyer et al. |
| 7,761,892 | B2 | 7/2010 | Ellis et al. |
| 8,046,801 | B2 | 10/2011 | Ellis et al. |
| 8,984,550 | B2 | 3/2015 | Craner et al. |
| 2002/0174430 | A1 | 11/2002 | Ellis et al. |
| 2003/0110499 | A1 | 6/2003 | Knudson et al. |
| 2005/0022239 | A1 | 1/2005 | Meuleman |
| 2005/0251827 | A1 | 11/2005 | Ellis et al. |
| 2010/0153885 | A1 | 6/2010 | Kates |
| 2011/0099572 | A1 | 4/2011 | Craner et al. |
| 2011/0167342 | A1 | 7/2011 | De et al. |
| 2012/0066235 | A1 | 3/2012 | Itakura |
| 2014/0082659 | A1 | 3/2014 | Fife et al. |
| 2014/0181910 | A1 | 6/2014 | Fingal et al. |
| 2015/0249864 | A1 | 9/2015 | Tang et al. |
| 2015/0382052 | A1 | 12/2015 | Pearlman et al. |
| 2016/0088352 | A1 | 3/2016 | Agarwal et al. |

FOREIGN PATENT DOCUMENTS

| | | |
|---|---|---|
| CN | 102665099 A | 9/2012 |
| CN | 104126315 A | 10/2014 |
| CN | 105100207 A | 11/2015 |
| CN | 105260430 A | 1/2016 |
| CN | 105339895 A | 2/2016 |
| CN | 105431814 A | 3/2016 |
| CN | 105488749 A | 4/2016 |
| CN | 105681376 A | 6/2016 |
| JP | 2005258989 A | 9/2005 |
| JP | 2008271570 A | 11/2008 |
| JP | 2015053709 A | 3/2015 |
| JP | 2015146212 A | 8/2015 |
| JP | 2015220541 A | 12/2015 |
| KR | 20090112535 A | 10/2009 |
| KR | 10-2012-0040703 A | 4/2012 |
| KR | 10 20160038902 A | 4/2016 |
| WO | 2010089961 A1 | 8/2010 |

METHODS AND SYSTEMS FOR RECOMMENDING TO A FIRST USER MEDIA ASSETS FOR INCLUSION IN A PLAYLIST FOR A SECOND USER BASED ON THE SECOND USER'S VIEWING ACTIVITY

CROSS-REFERENCE TO RELATED APPLICATIONS

This application is a continuation of U.S. patent application Ser. No. 16/889,162, filed Jun. 1, 2020, which is a continuation of U.S. patent application Ser. No. 15/188,562, filed Jun. 21, 2016, now U.S. Pat. No. 10,708,664, the disclosures of which are hereby incorporated by reference herein in their entireties.

BACKGROUND

Parents may create playlists for their children so that the children can view approved content without continuously having to request permission from the parents to view the content. However, because of children's rapidly changing tastes in content, it can be very difficult for parents to identify content that their children will not object to. This problem is further exacerbated by the plethora of content available to choose from. If parents continuously include content in their children's playlist that their children do not like, they will receive frequent requests from their children for new content. This can be very disruptive to the current activities that parents and children are engaging in and a source of frustration for both parties.

SUMMARY

Systems and methods are provided herein for providing a first user with recommendations of media assets for inclusion in a playlist for a second user based on the second user's viewing activity. These systems and methods receive, from the second user, an expression of disinterest in a media asset included in the playlist for the second user, update a user profile associated with the second user based on the expression of disinterest, and determine a recommendation for another media asset based on the updated user profile associated with the second user. These systems and methods then generate for display for the first user the recommendation for another media asset.

An interactive media guidance application receives, from the first user, a selection of a plurality of media assets to be included in the playlist for the second user. For example, the interactive media guidance application may generate for display a plurality of media asset identifiers (e.g., text listings, graphical listings, audio listings and other suitable identifiers) and corresponding selectable options (e.g., "select," "add to playlist," and other suitable options) to allow the first user to select the plurality of media assets for inclusion in the playlist. For example, the interactive media guidance application may generate for display media asset identifiers for media assets A through Z along with a selectable "add to playlist" option corresponding to each of these media asset identifiers. The interactive media guidance application may receive, from the first user (e.g., Mom), a selection of the selectable "add to playlist" options corresponding to media asset identifiers for media assets A, B and C.

The interactive media guidance application generates for display, for the second user, the plurality of media assets in the playlist. For example, the interactive media guidance application may generate for display the media asset identifiers corresponding to media assets A, B and C for the second user (e.g., Teddy). The interactive media guidance application receives, from the second user, an expression of disinterest in a first media asset of the plurality of media assets. For example, the interactive media guidance application may receive, from Teddy, an expression of disinterest in media asset A. An expression of disinterest in a media asset is any suitable means of communicating that the media asset fails to satisfy the second user in some aspect.

In some embodiments, the interactive media guidance application receiving the expression of disinterest in the first media asset comprises the interactive media guidance application receiving a request from the second user to remove the first media asset from the playlist prior to playback of the first media asset. The interactive media guidance application may generate for display a variety of selectable options corresponding to each media asset identifier in the playlist for the second user. For example, the interactive media guidance application may generate for display selectable options "play" and "remove from playlist" corresponding to media asset identifier for media asset A. Upon receiving a selection of the "remove from playlist" option for media asset A prior to receiving any selection of the "play" option for media asset A, the interactive media guidance application determines that the interactive media guidance application has received the expression of disinterest in media asset A from the second user.

In some embodiments, the interactive media guidance application receiving the expression of disinterest in the first media asset comprises the interactive media guidance application receiving a request to terminate playback of the first media asset before a threshold time has elapsed from a start time of the playback of the first media asset. The threshold time defines a minimum period of time that the second user will spend viewing a media asset if the second user does not have a disinterest in the media asset. The threshold time may be a constant time period (e.g., 10 minutes) or a variable time period determined based on the length of a media asset (e.g., 25% of the length of a media asset). In some embodiments, the interactive media guidance application may determine the threshold time based on the playlist associated activity of the second user. For example, if the interactive media guidance application determines that the second user has an unusually short attention span in general, the interactive media guidance application may set the threshold time to a higher value. The interactive media guidance application may access a data structure (e.g., threshold parameters data structure) associated with the user profile associated with the second user or a separate data structure to determine the value corresponding to the threshold time. The interactive media guidance application may use a Boolean comparison function to determine whether the time elapsed from a start time of the playback of the first media asset exceeds the threshold time. For example, if the threshold time is 10 minutes and the interactive media guidance application receives a request from the second user to terminate playback of media asset A after five minutes of playback, the interactive media guidance application determines that the interactive media guidance application has received the expression of disinterest in media asset A from the second user.

In some embodiments, the interactive media guidance application may wait a predefined period of time upon receiving a request to terminate playback of the first media asset before the threshold time has elapsed before determining that the request constitutes the expression of disinterest in the first media asset. The interactive media guidance application may determine a total playback time for the first media at the end of the predefined period. For example, the interactive media guidance application may maintain a total playback time data structure and the interactive media guidance application may update the value of total playback time of the first media asset in this data structure based on the current time and playback of the first media asset. The interactive media guidance application may use a Boolean comparison function to determine whether the total playback time for the first media asset at the end of the predefined period of time is less than the threshold time. Upon determining that the total playback time for the first media asset at the end of the predefined period of time is less than the threshold time, the interactive media guidance application may determine that the interactive media guidance application has received the expression of disinterest in the first media asset. For example, the interactive media guidance application may, upon receiving the second user request to terminate playback of media asset A after five minutes of playback, may wait for a 24 hour period before determining whether the request constitutes an expression of disinterest in media asset A. If, for example, the second user resumes playback of the media asset A for another 15 minutes during the 24 hour period, the interactive media guidance application may determine that the total playback time for media asset A at the end of the pre-defined time period is 20 minutes. In this case, the interactive media guidance application may determine, because the total playback time for media asset A exceeds the threshold time, that the request does not constitute an expression of disinterest in media asset A.

In some embodiments, the interactive media guidance application receiving the expression of disinterest in the first media asset comprises the interactive media guidance application determining that a proportion of the first media asset viewed uninterrupted by the second user is less than a threshold proportion. The threshold proportion defines a minimum proportion of a media asset (e.g., 60% of a media asset) that the second user will spend viewing uninterrupted if the second user does not have a disinterest in the media asset. The interactive media guidance application may access a data structure (e.g., threshold parameters data structure) associated with the user profile associated with the second user or a separate data structure to determine the value corresponding to the threshold proportion. The interactive media guidance application may use a Boolean comparison function to determine whether the proportion of the first media asset viewed uninterrupted by the second user is less than the threshold proportion (e.g., "proportion viewed uninterrupted<threshold proportion" Boolean function). In some embodiments, the interactive media guidance application may adapt the value of the threshold proportion based on the playlist associated activity of the second user (e.g., the threshold may be set to be 40% if the second user frequently views media assets with interruptions). Interruptions to viewing may be pausing playback, fast-forwarding, performing other activities simultaneously with playback of the media asset (e.g., simultaneously playing back another media asset, browsing social media, executing another application) and other suitable interruptions. For example, the threshold proportion may be 50%. If the second user fast-forwards through 65% of media asset A, the interactive media guidance application determines that the proportion of the first media asset viewed uninterrupted is 35%. In this case, the interactive media guidance application receives a "true" value from the "proportion viewed uninterrupted<threshold proportion" Boolean function and the interactive media guidance application determines that the interactive media guidance application has received the expression of disinterest in media asset A from the second user.

In some embodiments, the interactive media guidance application receiving the expression of disinterest in the first media asset comprises the interactive media guidance application receiving a feedback about the first media asset from the second user and the interactive media guidance application determining that the feedback corresponds to a pre-defined expression of disinterest. Feedback about the first media asset may be structured responses (e.g., a score, a response to a prompt such as "Did you like the media asset?"), unstructured comments and any other suitable means of communicating the second user's level of disinterest in the first media asset. The interactive media guidance application may access a data structure (e.g., threshold parameters data structure) associated with the user profile associated with the second user or a separate data structure to determine a pre-defined expression of disinterest. The interactive media guidance application may determine that the feedback corresponds to a pre-defined expression of disinterest using a Boolean comparison function.

For example, the interactive media guidance application may generate for display a selectable option "Rate this media asset" corresponding to each media asset in the playlist. Upon receiving a selection of the "Rate this media asset" option, the interactive media guidance application may generate for display selectable options (e.g., letter ratings system, numerical rating system, and any other suitable rating criteria) for receiving the rating from the second user. For example, the interactive media guidance application may receive a selection of the "Rate this media asset" option corresponding to media asset A from the second user. In response, the interactive media guidance application may generate for display selectable options A, B, C, D, E and F. The interactive media guidance application may receive a selection of the option C from the second user. The interactive media guidance application may then access a data structure associated with the playlist (e.g., threshold parameters data structure) to determine a value corresponding to the pre-defined expression of disinterest. For example, the threshold parameters data structure may include C, D, E and F as pre-defined expressions of disinterest. In this case, the interactive media guidance application receives a "true" result from a "feedback=pre-defined expression of disinterest" Boolean function. Upon receiving the "true" result, the interactive media guidance application may determine that the interactive media guidance application has received an expression of disinterest in media asset A from the second user.

In some embodiments, the interactive media guidance application receives unstructured feedback such as unstructured text (e.g., response to some equivalent of the prompt "Leave comments"), social media activity (e.g., posting information about a media asset on social media such as "Watched media asset A. It was very bad."), audio and/or video feedback and other suitable unstructured feedback. In these cases, the interactive media guidance application may perform additional analytical steps to determine the level of disinterest expressed by the second user. For example, the interactive media guidance application may receive text response "This was so boring that I wanted do my homework instead." to the "Leave comments" selectable option corresponding to media asset A. The interactive media guidance application may perform semantic analysis on the text to determine a level of disinterest expressed in the text response. The interactive media guidance application may then determine, based on the level of disinterest that has been pre-defined as an expression of disinterest in a data structure associated with the playlist (e.g., threshold parameters data structure) or a separate data structure, whether the text response constitutes an expression of disinterest. For example, the interactive media guidance application may determine, based on semantic analysis, that the level of disinterest expressed in the text response "This was so boring that I wanted do my homework instead" is 85%. The interactive media guidance application may access the threshold parameters data structure to determine that the level of disinterest pre-defined as an expression of disinterest is 50%. In this case, the interactive media guidance application determines that the interactive media guidance application has received an expression of disinterest in media asset A from the second user.

The interactive media guidance application, based on receiving the expression of disinterest, updates a user profile associated with the second user based on the expression of disinterest in the first media asset from the second user. For example, upon receiving the expression of disinterest in media asset A from Teddy, the interactive media guidance application updates Teddy's user profile. In some embodiments, the user profile associated with the second user includes a plurality of attributes and corresponding weights. Attributes may be descriptors typically associated with media content such as but not limited to genre (e.g., drama, comedy, animation, science fiction), actor, director, producer, studio (e.g., Walt Disney Studios, Warner Bros. Entertainment, NBC Universal) plot, key words, key sequences. For example, Teddy's user profile may include an attributes data structure that includes the attributes animation, science fiction, Walt Disney Studios, plot x and plot y and the corresponding weights. In some embodiments, the weights are initialized to default values based on the age of the second user.

The interactive media guidance application may determine, for example, that Teddy is 11 years old. The interactive media guidance application may then access a data structure (e.g., default attributes settings data structure) to determine the default values of weights corresponding to the attributes included in the attributes data structure in Teddy's user profile for an 11 year old. The interactive media guidance application may then initialize the values of the weights corresponding to the attributes in the attributes data structure in Teddy's user profile with the default values of the weights for an 11 year old from the default attributes settings data structure. For example, the interactive media guidance application may determine, by accessing the default attributes settings data structure, that the default values of weights corresponding to the attributes animation, science fiction, Walt Disney Studios, plot x and plot y for an 11 year old are 3, 1, 3, 2, and 1 respectively. The interactive media guidance application may then set the values of the weights corresponding to the attributes animation, science fiction, Walt Disney Studios, plot x and plot y to 3, 1, 3, 2, and 1 respectively in the attributes data structure in Teddy's user profile.

In some embodiments, the first media asset has an associated first plurality of attributes. For example, media asset A has the attributes science fiction, Walt Disney Studios and plot x. The interactive media guidance application may retrieve metadata corresponding to the first media asset by querying a database (e.g., content listings database of the content source providing media asset A) for the metadata corresponding to the first media asset. The interactive media guidance application may perform the query using database management languages such as SQL, JAPQL, CODASYL or another suitable language. The interactive media guidance application may extract the first plurality of attributes from the metadata corresponding to the first media asset using a suitable metadata extraction tool.

In some embodiments, the interactive media guidance application updates the user profile associated with the second user based on the expression of disinterest in the first media asset by decreasing weights corresponding to the first plurality of attributes in the user profile. For example, the interactive media guidance application may, upon receiving the expression of disinterest in media asset A, decrease the weights corresponding to science fiction, Walt Disney Studios and plot x in the attributes data structure in Teddy's user profile. From the previous example, the interactive media guidance application initially set the weights corresponding to the attributes science fiction, Walt Disney Studios and plot x to 1, 3 and 2 respectively. After receiving the expression of disinterest in media asset A, the interactive media guidance application may decrease the weights corresponding to science fiction, Walt Disney Studios and plot x to 0, 2 and 1 respectively.

In some embodiments, an attribute of the first plurality of attributes associated with the first media asset may not be included in the user profile associated with the second user. In such an instance, the interactive media guidance application may update the user profile associated with the second user to include the attribute. For example, an attribute associated with media asset A may be actor X. The interactive media guidance application may determine (e.g., by using a Boolean query function) that the attribute actor X is not included in the attributes data structure in Teddy's user profile. The interactive media guidance application may then update the attributes data structure in Teddy's user profile to include the attribute actor X.

In some embodiments, the interactive media guidance application determines whether the number of expressions of disinterest received during a period of time exceeds a threshold number of expressions of disinterest during the period of time. The period of time (e.g., one hour) and the threshold number of expressions of disinterest (e.g., five expressions of disinterest) may be some default value or provided by the first user. The interactive media guidance application may access a data structure (e.g., threshold parameters data structure) associated with the user profile associated with the second user or a separate data structure to determine the values corresponding to the period of time and the threshold number of expressions of disinterest. For example, the interactive media guidance application may maintain a counter of the number of expressions of disinterest received during the period of time. The interactive media guidance application may continuously update the value of the counter based on the current time and receiving an expression of disinterest in a media asset. Each time the interactive media guidance application receives an expression of disinterest, the interactive media guidance application may compare the updated value of the counter with the threshold number of expressions of disinterest during the period of time to determine if the value of the counter exceeds the threshold number of expressions of disinterest. For example, the interactive media guidance application may use a Boolean comparison function (e.g., "counter>threshold number" Boolean comparison function) to perform this determination.

In some embodiments, the interactive media guidance application may, in response to determining that the number of expressions of disinterest received during a period of time does not exceed the threshold number, update the user profile associated with the second user based on the expression of disinterest in the first media asset. Techniques by which the interactive media guidance application may update the user profile associated with the second user based on the expression of disinterest in the first media asset discussed previously are applicable here. For example, upon receiving an expression of disinterest in media asset A, the interactive media guidance application may determine that the updated value of the counter of the number of expressions of disinterest received during one hour is 3. In this case, the interactive media guidance application receives a "false" result from the "counter>threshold number" Boolean comparison function, and the interactive media guidance application determines that the counter does not exceed the threshold number. The interactive media guidance application may then update Teddy's user profile based on the expression of disinterest in media asset A.

In some embodiments, the interactive media guidance application may, in response to determining that the number of expressions of disinterest received during a period of time exceeds the threshold number, make no changes to the user profile associated with the second user based on the expression of disinterest in the first media asset. For example, upon receiving an expression of disinterest in media asset A, the interactive media guidance application may determine that the updated value of the counter of the number of expressions of disinterest received during one hour is 6. In this case, the interactive media guidance application receives a "true" result from the "counter>threshold number" Boolean comparison function and the interactive media guidance application determines that the counter exceeds the threshold number. In this instance, the interactive media guidance application may make no changes to Teddy's user profile based on the expression of disinterest in media asset A.

The interactive media guidance application determines a recommendation for a second media asset for inclusion in the playlist for the second user based on the updated user profile associated with the second user. The interactive media guidance application may use any suitable recommendation algorithm to determine a recommendation for a second media asset based on the updated user profile. In some embodiments, the interactive media guidance application may determine a second plurality of attributes associated with the second media asset. Manners in which the interactive media guidance application may determine attributes associated with a media asset from the metadata corresponding to the media asset discussed previously are applicable here. The interactive media guidance application may compare the second plurality of attributes with the plurality of attributes and the corresponding weights in the user profile associated with the second user to determine a similarity coefficient for the second media asset. For example, the interactive media guidance application may sum the weights corresponding to the second plurality of attributes in the user profile associated with the second user to determine the similarity coefficient for the second media asset. The interactive media guidance application may then compare the similarity coefficient for the second media asset to a threshold similarity coefficient using a Boolean comparison function. The interactive media guidance application may access a data structure (e.g., threshold parameters data structure) associated with the user profile associated with the second user or a separate data structure to determine the value corresponding to the threshold similarity coefficient. In some embodiments, upon determining that the similarity coefficient for the second media asset exceeds the threshold similarity coefficient, the interactive media guidance application determines that the second media asset should be recommended for inclusion in the playlist for the second user.

From the previous example, after Teddy's user profile is updated based on the expression of disinterest in media asset A, the plurality of attributes in the attributes data structure are animation, science fiction, Walt Disney Studios, plot x and plot y and the corresponding weights are 3, 0, 2, 1, and 1 respectively. For example, media asset M has attributes animation and Walt Disney Studios, and media asset F has attributes science fiction and plot x. The interactive media guidance application may determine the similarity coefficients for media asset M and media asset F to be 5 and 1, respectively. The threshold similarity coefficient may be 2. In this case, the interactive media guidance application may determine, based on the results of a Boolean comparison function, that only media asset M should be recommended for inclusion in the playlist for Teddy.

The interactive media guidance application, upon determining a recommendation for a second media asset for inclusion in the playlist for the second user, generates for display, for the first user, the recommendation for the second media asset. From the previous example, the interactive media guidance application, upon determining that media asset M should be recommended for inclusion in the playlist for Teddy, generates for display, for Mom, a recommendation to include media asset M in the playlist for Teddy.

In some embodiments, the interactive media guidance application receives, from the first user, an expression of disinterest in the recommendation for the second media asset. For example, the interactive media guidance application may receive an expression of disinterest in media asset M from Mom (e.g., a request from Mom to remove media asset M from the recommendations). In some embodiments, the interactive media guidance application, in response to receiving the expression of disinterest in the recommendation for the second media asset, updates the user profile associated with the second user based on the expression of disinterest in the recommendation. For example, the interactive media guidance application may update Teddy's user profile based on the request from Mom to remove media asset M from the recommendations. Techniques by which the interactive media guidance application may update the user profile associated with the second user discussed previously are applicable here. The interactive media guidance application may determine a recommendation for a third media asset for inclusion in the playlist for the second user based on the updated user profile associated with the second user. Manners in which the interactive media guidance application performs this determination discussed previously are applicable here. The interactive media guidance application may generate for display, for the first user, the recommendation for the third media asset. For example, the interactive media guidance application may determine that media asset X should be recommended for inclusion in the playlist for Teddy. The interactive media guidance application may then generate for display, for Mom, a recommendation to include media asset X in the playlist for Teddy.

In some embodiments, the interactive media guidance application receives, from the first user, a selection of a subset of media assets of the plurality of media assets to be included in the playlist for the second user for which the expression of disinterest from the second user is to be disregarded. For example, the interactive media guidance application may generate for display a selectable option (e.g., some equivalent of "Disregard expression of disinterest in media asset by second user") corresponding to each media asset identifier to allow the first user to select the subset of media assets for which the expression of disinterest from the second user is to be disregarded. For example, the interactive media guidance application may receive a selection from Mom to include media assets A, B and C in the playlist for Teddy. The interactive media guidance application may also receive, from mom, a selection of the selectable option "Disregard expression of disinterest in media asset by second user" corresponding to media asset A. In some embodiments, the interactive media guidance application, upon receiving the selection of the subset of media assets for the second user for which the expression of disinterest from the second user is to be disregarded, stores the media assets identifiers corresponding to the subset of media assets in a data structure (e.g., "disregard list"). For example, the interactive media guidance application may store the media asset identifier for media asset A in the "disregard list" data structure.

In some embodiments, the interactive media guidance application updating the user profile associated with the second user based on the expression of disinterest in the first media asset further comprises the interactive media guidance application determining whether the first media asset is included in the subset of media assets for which the expression of disinterest from the second user is to be disregarded. For example, the interactive media guidance application, upon receiving the expression of disinterest in the first media asset from the second user, may use a Boolean comparison function to compare the media asset identifier of the first media asset with the media asset identifiers stored in the "disregard list" data structure. The interactive media guidance application may determine that the first media asset is included in the subset of media assets for which the expression of disinterest from the second user is to be disregarded if the Boolean comparison function returns a "true" result. The interactive media guidance application may determine that the first media asset is not included in the subset of media assets for which the expression of disinterest from the second user is to be disregarded if the Boolean comparison function returns a "false" result.

In some embodiments, the interactive media guidance application, in response to determining that the first media asset is included to the subset of media assets for which the expression of disinterest from the second user is to be disregarded, makes no changes to the user profile associated with the second user based on the expression of disinterest in the first media asset. For example, the interactive media guidance application receives an expression of disinterest in the media asset A from Teddy and the interactive media guidance application determines that media asset A is included in the "disregard list" data structure. In this instance, the interactive media guidance application makes no changes to Teddy's user profile based on the expression of disinterest in media asset A. In some embodiments, the interactive media guidance application, in response to determining that the first media asset is not included in the subset of media assets for which the expression of disinterest from the second user is to be disregarded, updates the user profile associated with the second user based on the expression of disinterest in the first media asset. For example, the interactive media guidance application receives an expression of disinterest in the media asset B from the Teddy and the interactive media guidance application determines that media asset B is not included in the "disregard list" data structure. In this instance, the interactive media guidance application updates Teddy's user profile based on the expression of disinterest in media asset B. Techniques by which the interactive media guidance application may update Teddy's user profile based on the expression of disinterest in media asset B discussed previously are applicable here.

Parents create playlists for their children so that the children can view approved content without continuously interrupting them to request permission to view the content. In order to minimize interruptions, parents have to choose content that their children will not object to. Given the plethora of available content and children's rapidly changing tastes, it is virtually impossible for parents to manually track types of content their children typically object to and, based on those objections, select content that is least likely to be objected to. As a result, parents invariably include content that their children object to and receive frequent requests from their children for new content. This can be very disruptive to the current activities that parents and children are engaging in and a source of frustration for both parties.

Systems and methods provided herein address this issue by monitoring expressions of disinterest in content received from a child, updating the child's user profile based on the expressions of disinterest and providing a recommendation for other content, determined based on the updated child's user profile, to the parent. This approach uses a more complete set of parameters for determining content to recommend and can consequently identify content that is least likely to be objected to more accurately.

Conventional systems may determine recommendations for other content based on what the child has watched. Consequently, because they do not take into account expressions of disinterest in content received from a child, conventional systems are more likely than the proposed invention to recommend content that will be objected to. For example, the child may have watched content 1. Based on this, conventional systems may recommend content 2. However, content 2 may have attribute A that the child had previously expressed disinterest in. Because conventional systems do not monitor for expressions of disinterest, conventional systems would recommend content 2, which would subsequently be objected to by the child. The proposed invention would determine that content 2 should not be recommended based on the previously received expression of disinterest and would recommend other content that is less likely to be objected to.

It should be noted that the systems and/or methods described above may be applied to, or used in accordance with, other systems, methods and/or apparatuses in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

As referred to herein, an "interactive media guidance application," or a "media guidance application" or, sometimes, a "media guidance application" or a "guidance application" is an application that allows a user to consume, and/or navigate to content. In some embodiments, the media guidance application may be provided as an online application (i.e., provided on a website), or as a stand-alone application on a server, user device. In some embodiments, control circuitry installed on various devices and platforms may execute the media guidance application, as described in more detail below. In some embodiments, the media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and nonvolatile computer memory or storage devices such as a hard disk, floppy disk, USB drive, DVD, CD, media card, register memory, processor caches, Random Access Memory ("RAM").

Figure 1:
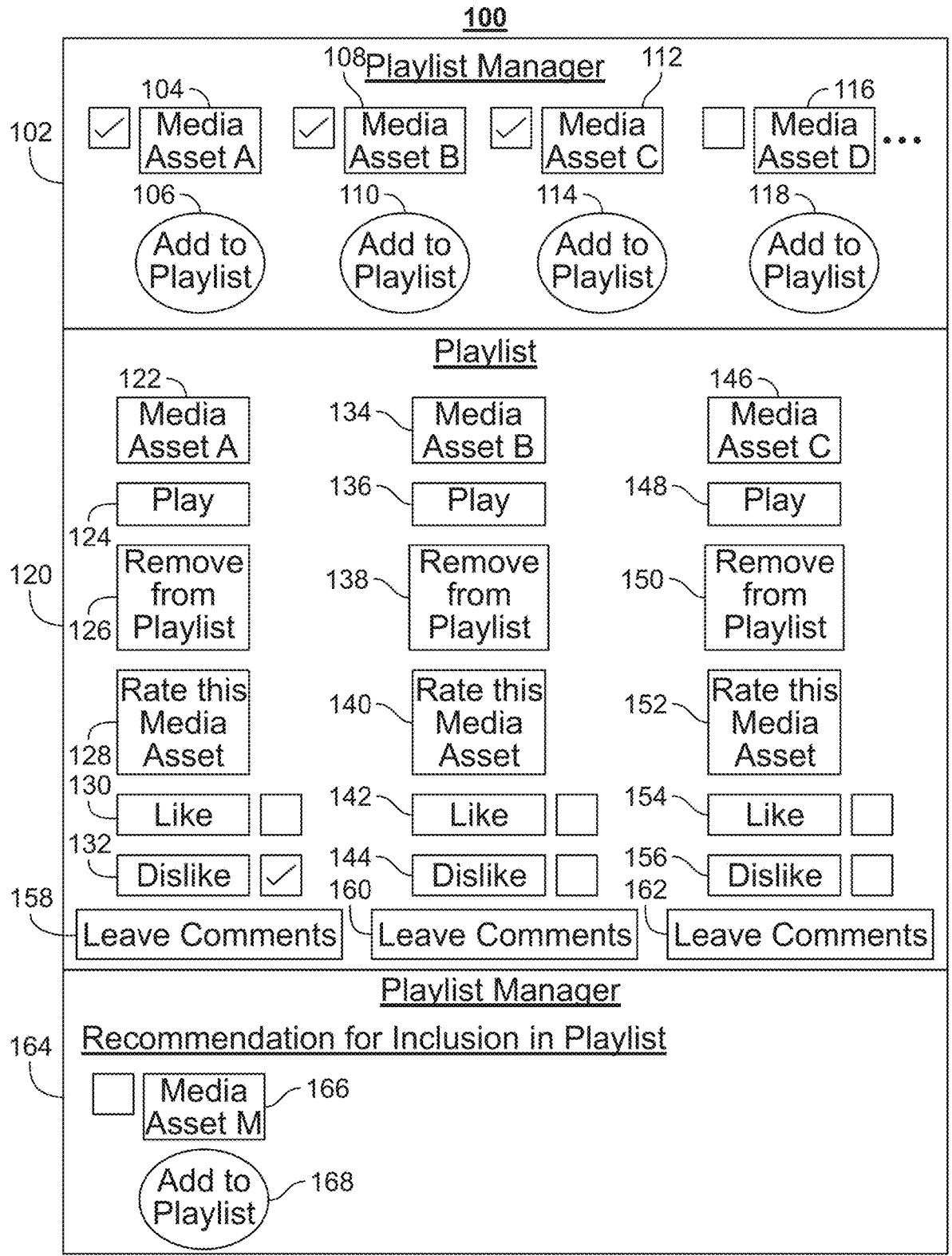
FIG. 1 depicts an illustrative display of the interactive media guidance application in accordance with some embodiments of the disclosure.

FIG. 1 depicts an illustrative display of the interactive media guidance application in accordance with some embodiments of the disclosure. FIG. 1 depicts an illustrative display 100, which may be displayed on any user device (e.g., user television equipment 602, user computer equipment 604, and wireless user communications device 606, described in FIG. 6 below). Control circuitry 504 may cause displays to be displayed on display 512 using the one or more of the processes described in FIGS. 7-10.

Display 100 is an example of a display generated by the interactive media guidance application to provide the first user with the recommendation for the second media asset based on the expression of disinterest in the first media asset from the second user. Display 100 may include a variety of displays such as displays 102, 120 and 164. Display 102 is an example of a display generated by the interactive media guidance application for receiving from the first user the selection of the plurality of media assets to be included in the playlist for the second user. For example, the interactive media guidance application may generate for display a plurality of media asset identifiers such as "Media Asset A" 104, "Media Asset B" 108, "Media Asset C" 112 and "Media Asset D" 118 along with a selectable option corresponding to each media asset identifier (e.g., selectable option "add to playlist" 106 corresponding "Media Asset A" 104; selectable option "add to playlist" 110 corresponding "Media Asset B" 108; selectable option "add to playlist" 114 corresponding "Media Asset C" 112; selectable option "add to playlist" 118 corresponding "Media Asset D" 116). The interactive media guidance application may receive, from the first user (e.g., Mom), a selection to include "Media Asset A" 104, "Media Asset B" 108 and "Media Asset C" 112 in the playlist upon receiving a selection of the options "add to playlist" 106, "add to playlist" 110, and "add to playlist" 114 via user input interface 510.

Display 102 is an example of a display generated by the interactive media guidance application for displaying the plurality of media assets in the play list to the second user. For example, the interactive media guidance application may generate for display media asset identifiers for the plurality of media assets selected by the first user (e.g., "Media Asset A" 122, "Media Asset B" 134 and "Media Asset C" 146). The interactive media guidance application may also generate for display one or more selectable options corresponding to each media asset identifier to allow the second user to perform actions associated with each media asset. For example, the interactive media guidance application may generate for display selectable options "Play" 124, "Remove from playlist" 126, "Rate this media asset" 128, "Like" 130, "Dislike" 132 and "leave comments" 158 corresponding to "Media Asset A" 122. Similarly, the interactive media guidance application may generate for display selectable options "Play" 136, "Remove from playlist" 138, "Rate this media asset" 140, "Like" 142, "Dislike" 144 and "leave comments" 160 corresponding to "Media Asset B" 134 and selectable options "Play" 148, "Remove from playlist" 150, "Rate this media asset" 152, "Like" 154, "Dislike" 156 and "leave comments" 162 corresponding to "Media Asset C" 146.

The interactive media guidance application receives, from the second user, an expression of disinterest in a first media asset of the plurality of media assets. For example, the interactive media guidance application may receive, from Teddy, an expression of disinterest in "Media asset A" 122. An expression of disinterest in a media asset is any suitable means of communicating that the media asset fails to satisfy the second user in some aspect.

In some embodiments, the interactive media guidance application receiving the expression of disinterest in the first media asset comprises the interactive media guidance application receiving a request from the second user to remove the first media asset from the playlist prior to playback of the first media asset. For example, the interactive media guidance application may receive, via user input interface 510, a selection of the "Remove from playlist" 126 option prior to any selection of the "Play" 124 option. In this instance, the interactive media guidance application may determine that the interactive media guidance application has received the expression of disinterest in "Media asset A" 122 from the second user.

In some embodiments, the interactive media guidance application receiving the expression of disinterest in the first media asset comprises the interactive media guidance application receiving a request to terminate playback of the first media asset before a threshold time has elapsed from a start time of the playback of the first media asset. The threshold time defines a minimum period of time that the second user will spend viewing a media asset if the second user does not have a disinterest in the media asset. The threshold time may be a constant time period (e.g., 10 minutes) or a variable time period determined based on the length of a media asset (e.g., 25% of the length of a media asset). In some embodiments, the interactive media guidance application may determine the threshold time based on the playlist associated activity of the second user. For example, if the interactive media guidance application determines that the second user has an unusually short attention span in general, the interactive media guidance application may set the threshold time to a higher value. The interactive media guidance application may access a data structure (e.g., threshold parameters data structure stored locally in storage 508 or remotely in media content source 616 and media guidance data source 618) associated with the user profile associated with the second user or a separate data structure to determine the value corresponding to the threshold time. The interactive media guidance application may use a Boolean comparison function to determine whether the time elapsed from a start time of the playback of the first media asset exceeds the threshold time. For example, if the threshold time is 10 minutes and the interactive media guidance application receives a request from the second user to terminate playback of "Media asset A" 122 after five minutes of playback (e.g., selection of a termination option 5 minutes after a selection of "Play" 124 option), the interactive media guidance application determines that the interactive media guidance application has received the expression of disinterest in "Media asset A" 122 from the second user.

In some embodiments, the interactive media guidance application may wait a predefined period of time upon receiving a request to terminate playback of the first media asset before the threshold time has elapsed before determining that the request constitutes the expression of disinterest in the first media asset. The interactive media guidance application may determine a total playback time for the first media at the end of the predefined period. For example, the interactive media guidance application may maintain a total playback time data structure and the interactive media guidance application may update the value of total playback time of the first media asset in this data structure based on the current time and playback of the first media asset. The interactive media guidance application may use a Boolean comparison function to determine whether the total playback time for the first media asset at the end of the predefined period of time is less than the threshold time. Upon determining that the total playback time for the first media asset at the end of the predefined period of time is less than the threshold time, the interactive media guidance application may determine that the interactive media guidance application has received the expression of disinterest in the first media asset. For example, the interactive media guidance application may, upon receiving the second user request to terminate playback of "Media asset A" 122 after five minutes of playback, may wait for a 24 hour period before determining whether the request constitutes an expression of disinterest in media asset A. If, for example, the second user resumes playback of the "Media asset A" 122 for another 15 minutes during the 24 hour period, the interactive media guidance application may determine that the total playback time for "Media asset A" 122 at the end of the pre-defined time period is 20 minutes. In this case, the interactive media guidance application may determine, because the total playback time for "Media asset A" 122 exceeds the threshold time, the request does not constitute an expression of disinterest in "Media asset A" 122.

In some embodiments, the interactive media guidance application receiving the expression of disinterest in the first media asset comprises the interactive media guidance application determining that a proportion of the first media asset viewed uninterrupted by the second user is less than a threshold proportion. The threshold proportion defines a minimum proportion of a media asset (e.g., 60% of a media asset) that the second user will spend viewing uninterrupted if the second user does not have a disinterest in the media asset. The interactive media guidance application may access a data structure (e.g., threshold parameters data structure stored locally in storage 508 or remotely in media content source 616 and media guidance data source 618) associated with the user profile associated with the second user or a separate data structure to determine the value corresponding to the threshold proportion. The interactive media guidance application may use a Boolean comparison function to determine whether the proportion of the first media asset viewed uninterrupted by the second user is less than the threshold proportion (e.g., "proportion viewed uninterrupted<threshold proportion" Boolean function). In some embodiments, the interactive media guidance application may adapt the value of the threshold proportion based on the playlist associated activity of the second user (e.g., the threshold may be set to be 40% if the second user frequently views media assets with interruptions). Interruptions to viewing may be pausing playback, fast-forwarding, performing other activities simultaneously with playback of the media asset (e.g., simultaneously playing back another media asset, browsing social media, executing another application) and other suitable interruptions. For example, the threshold proportion may be 50%. If the second user fast-forwards through 65% of "Media asset A" 122, the interactive media guidance application determines that the proportion of the first media asset viewed uninterrupted is 35%. In this case, the interactive media guidance application receives a "true" value from the "proportion viewed uninterrupted<threshold proportion" Boolean comparison function and the interactive media guidance application determines that the interactive media guidance application has received the expression of disinterest in "Media asset A" 122 from the second user.

In some embodiments, the interactive media guidance application receiving the expression of disinterest in the first media asset comprises the interactive media guidance application receiving a feedback about the first media asset from the second user and the interactive media guidance application determining that the feedback corresponds to a pre-defined expression of disinterest. Feedback about the first media asset may be structured responses (e.g., a score, a response to a prompt such as "Did you like the media asset?"), unstructured comments and any other suitable means of communicating the second user's level of disinterest in the first media asset. The interactive media guidance application may access a data structure (e.g., threshold parameters data structure stored locally in storage 508 or remotely in media content source 616 and media guidance data source 618) associated with the user profile associated with the second user or a separate data structure to determine a pre-defined expression of disinterest. The interactive media guidance application may determine that the feedback corresponds to a pre-defined expression of disinterest using a Boolean comparison function.

For example, the interactive media guidance application may generate for display selectable options "Rate this media asset" 128, "Rate this media asset" 140 and "Rate this media asset" 152 to allow the second user to rate "Media Asset A" 122, "Media Asset A" 134 and "Media Asset A" 146, respectively. Upon receiving a selection of any of 128, 140 and 152, the interactive media guidance application may generate for display selectable options (e.g., letter ratings system, numerical rating system, and any other suitable rating criteria) for receiving the rating from the second user. For example, the interactive media guidance application may receive a selection of the "Rate this media asset" 128" option corresponding to "Media asset A" 122 from the second user. In response, the interactive media guidance application may generate for display selectable options A, B, C, D, E and F. The interactive media guidance application may receive a selection of the option C from the second user. The interactive media guidance application may then access a data structure associated with the playlist (e.g., threshold parameters data structure stored locally in storage 508 or remotely in media content source 616 and media guidance data source 618) to determine a value corresponding to the pre-defined expression of disinterest. For example, the threshold parameters data structure may include C, D, E and F as pre-defined expressions of disinterest. In this case, the interactive media guidance application receives a "true" result from a "feedback=pre-defined expression of disinterest" Boolean function. Upon receiving the "true" result, the interactive media guidance application may determine that the interactive media guidance application has received an expression of disinterest in "Media asset A" 122 from the second user. Similarly, the interactive media guidance application may determine that the interactive media guidance application has received an expression of disinterest in "Media asset A" 122 from the second user upon receiving a selection of the "Dislike" 132 option.

In some embodiments, the interactive media guidance application receives unstructured feedback such as unstructured text (e.g., response to some equivalent of the prompt "Leave comments"), social media activity (e.g., posting information about a media asset on social media such as "Watched media asset A. It was very bad."), audio and/or video feedback and other suitable unstructured feedback. For example, the interactive media guidance application may receive a selection of the "Leave comments" 158 option. In response, the interactive media guidance application may provide the user an option to input text comments via user input interface 510. In such cases, the interactive media guidance application may perform additional analytical steps to determine the level of disinterest expressed by the second user. For example, the interactive media guidance application may receive text response "This was so boring that I wanted do my homework instead." to the "Leave comments" 158 selectable option corresponding to "Media asset A" 122. The interactive media guidance application may perform semantic analysis on the text to determine a level of disinterest expressed in the text response. The interactive media guidance application may then determine, based on the level of disinterest that has been pre-defined as an expression of disinterest in a data structure associated with the playlist (e.g., threshold parameters data structure stored locally in storage 508 or remotely in media content source 616 and media guidance data source 618) or a separate data structure, whether the text response constitutes an expression of disinterest. For example, the interactive media guidance application may determine, based on semantic analysis, that the level of disinterest expressed in the text response "This was so boring that I wanted do my homework instead" is 85%. The interactive media guidance application may access the threshold parameters data structure to determine that the level of disinterest pre-defined as an expression of disinterest is 50%. In this case, the interactive media guidance application determines that the interactive media guidance application has received an expression of disinterest in "Media asset A" 122 from the second user.

The interactive media guidance application, based on receiving the expression of disinterest, updates a user profile associated with the second user based on the expression of disinterest in the first media asset from the second user. For example, upon receiving the expression of disinterest in media asset A from Teddy, the interactive media guidance application updates Teddy's user profile. In some embodiments, the user profile associated with the second user includes a plurality of attributes and corresponding weights. Attributes may be descriptors typically associated with media content such as but not limited to genre (e.g., drama, comedy, animation, science fiction), actor, director, producer, studio (e.g., Walt Disney Studios, Warner Bros. Entertainment, NBC Universal) plot, key words, key sequences. For example, Teddy's user profile may include an attributes data structure that includes the attributes animation, science fiction, Walt Disney Studios, plot x and plot y and the corresponding weights. In some embodiments, the weights are initialized to default values based on the age of the second user.

The interactive media guidance application may determine, for example, that Teddy is 11 years old. The interactive media guidance application may then access a data structure (e.g., default attributes settings data structure stored locally in storage 508 or remotely in media content source 616 and media guidance data source 618) to determine the default values of weights corresponding to the attributes included in the attributes data structure in Teddy's user profile for an 11 year old. The interactive media guidance application may then initialize the values of the weights corresponding to the attributes in the attributes data structure in Teddy's user profile with the default values of the weights for an 11 year old from the default attributes settings data structure. For example, the interactive media guidance application may determine, by accessing the default attributes settings data structure, that the default values of weights corresponding to the attributes animation, science fiction, Walt Disney Studios, plot x and plot y for an 11 year old are 3, 1, 3, 2, and 1 respectively. The interactive media guidance application may then set the values of the weights corresponding to the attributes animation, science fiction, Walt Disney Studios, plot x and plot y to 3, 1, 3, 2, and 1, respectively, in the attributes data structure in Teddy's user profile.

In some embodiments, the first media asset has an associated first plurality of attributes. For example, "Media asset A" 122 has the attributes science fiction, Walt Disney Studios and plot x. The interactive media guidance application may retrieve metadata corresponding to the first media asset by querying a database (e.g., content listings database of the content source providing media asset A located at media content source 616 and media guidance data source 618) for the metadata corresponding to the first media asset. The interactive media guidance application may perform the query using database management languages such as SQL, JAPQL, CODASYL or another suitable language. The interactive media guidance application may extract the first plurality of attributes from the metadata corresponding to the first media asset using a suitable metadata extraction tool.

In some embodiments, the interactive media guidance application updates the user profile associated with the second user based on the expression of disinterest in the first media asset by decreasing weights corresponding to the first plurality of attributes in the user profile. For example, the interactive media guidance application may, upon receiving the expression of disinterest in "Media asset A" 122, decrease the weights corresponding to science fiction, Walt Disney Studios and plot x in the attributes data structure in Teddy's user profile. From the previous example, the interactive media guidance application initially set the weights corresponding to the attributes science fiction, Walt Disney Studios and plot x to 1, 3 and 2 respectively. After receiving the expression of disinterest in "Media asset A" 122, the interactive media guidance application may decrease the weights corresponding to science fiction, Walt Disney Studios and plot x to 0, 2 and 1 respectively.

In some embodiments, an attribute of the first plurality of attributes associated with the first media asset may not be included in the user profile associated with the second user. In such an instance, the interactive media guidance application may update the user profile associated with the second user to include the attribute. For example, an attribute associated with "Media asset A" 122 may be actor X. The interactive media guidance application may determine (e.g., by using a Boolean query function) that the attribute actor X is not included in the attributes data structure in Teddy's user profile. The interactive media guidance application may then the update the attributes data structure in Teddy's user profile to include the attribute actor X.

In some embodiments, the interactive media guidance application determines whether number of expressions of disinterest received during a period of time exceeds a threshold number of expressions of disinterest during the period of time. The period of time (e.g., one hour) and the threshold number of expressions of disinterest (e.g., five expressions of disinterest) may be some default value or provided by the first user. The interactive media guidance application may access a data structure (e.g., threshold parameters data structure stored locally in storage 508 or remotely in media content source 616 and media guidance data source 618) associated with the user profile associated with the second user or a separate data structure to determine the values corresponding to the period of time and the threshold the number of expressions of disinterest. For example, the interactive media guidance application may maintain a counter of the number of expressions of disinterest received during the period of time. The interactive media guidance application may continuously update the value of the counter based on the current time and receiving an expression of disinterest in a media asset. Each time the interactive media guidance application receives an expression of disinterest, the interactive media guidance application may compare the updated value of the counter with the threshold number of expressions of disinterest during the period of time to determine if the value of the counter exceeds the threshold number of expressions of disinterest. For example, the interactive media guidance application may use a Boolean comparison function (e.g., "counter>threshold number" Boolean comparison function) to perform this determination.

In some embodiments, the interactive media guidance application may, in response to determining that the number of expressions of disinterest received during a period of time does not exceed the threshold number, update the user profile associated with the second user based on the expression of disinterest in the first media asset. Techniques by which the interactive media guidance application may update the user profile associated with the second user based on the expression of disinterest in the first media asset discussed previously are applicable here. For example, upon receiving an expression of disinterest in "Media asset A" 122, the interactive media guidance application may determine that the updated value of the counter of the number of expressions of disinterest received during one hour is 3. In this case, the interactive media guidance application receives a "false" result from the "counter>threshold number" Boolean comparison function and the interactive media guidance application determines that the counter does not exceed the threshold number. The interactive media guidance application may then update Teddy's user profile based on the expression of disinterest in "Media asset A" 122.

In some embodiments, the interactive media guidance application may, in response to determining that the number of expressions of disinterest received during a period of time exceeds the threshold number, make no changes to the user profile associated with the second user based on the expression of disinterest in the first media asset. For example, upon receiving an expression of disinterest in media asset A, the interactive media guidance application may determine that the updated value of the counter of the number of expressions of disinterest received during one hour is 6. In this case, the interactive media guidance application receives a "true" result from the "counter>threshold number" Boolean comparison function and the interactive media guidance application determines that the counter exceeds the threshold number. In this instance, the interactive media guidance application may make no changes to Teddy's user profile based on the expression of disinterest in "Media asset A" 122.

The interactive media guidance application determines a recommendation for a second media asset for inclusion in the playlist for the second user based on the updated user profile associated with the second user. The interactive media guidance application may use any suitable recommendation algorithm to determine a recommendation for a second media asset based on the updated user profile. In some embodiments, the interactive media guidance application may determine a second plurality of attributes associated with the second media asset. Techniques by which the interactive media guidance application may determine attributes associated with a media asset from the metadata corresponding to the media asset discussed previously are applicable here.

The interactive media guidance application may compare the second plurality of attributes with the plurality of attributes and the corresponding weights in the user profile associated with the second user to determine a similarity coefficient for the second media asset. For example, the interactive media guidance application may sum the weights corresponding to the second plurality of attributes in the user profile associated with the second user to determine the similarity coefficient for the second media asset. The interactive media guidance application may then compare the similarity coefficient for the second media asset to a threshold similarity coefficient using a Boolean comparison function. The interactive media guidance application may access a data structure (e.g., threshold parameters data structure stored locally in storage 508 or remotely in media content source 616 and media guidance data source 618) associated with the user profile associated with the second user or a separate data structure to determine the value corresponding to the threshold similarity coefficient. In some embodiments, upon determining that the similarity coefficient for the second media asset exceeds the threshold similarity coefficient, the interactive media guidance application determines that the second media asset should be recommended for inclusion in the playlist for the second user.

From the previous example, after Teddy's user profile is updated based on the expression of disinterest in "Media Asset A" 122, the plurality of attributes in the attributes data structure are animation, science fiction, Walt Disney Studios, plot x and plot y and the corresponding weights are 3, 0, 2, 1, and 1 respectively. For example, "Media asset M" 166 has attributes animation and Walt Disney Studios, and media asset F has attributes science fiction and plot x. The interactive media guidance application may determine the similarity coefficients for "Media asset M" 166 and media asset F to be 5 and 1 respectively. The threshold similarity coefficient may be 2. In this case, the interactive media guidance application may determine, based on results of a Boolean comparison function, that only "Media asset M" 166 should be recommended for inclusion in the playlist for Teddy.

Display 164 is an example of display that the interactive media guidance application may generate for display for the first user upon determining a recommendation for a second media asset for inclusion in the playlist for the second user. Display 164 includes a media asset identifier for the second media asset "Media asset M" 166 and selectable option "Add to Playlist" 168 to allow the first user to include "Media asset M" 166 in the playlist for the second user.

Figure 2:
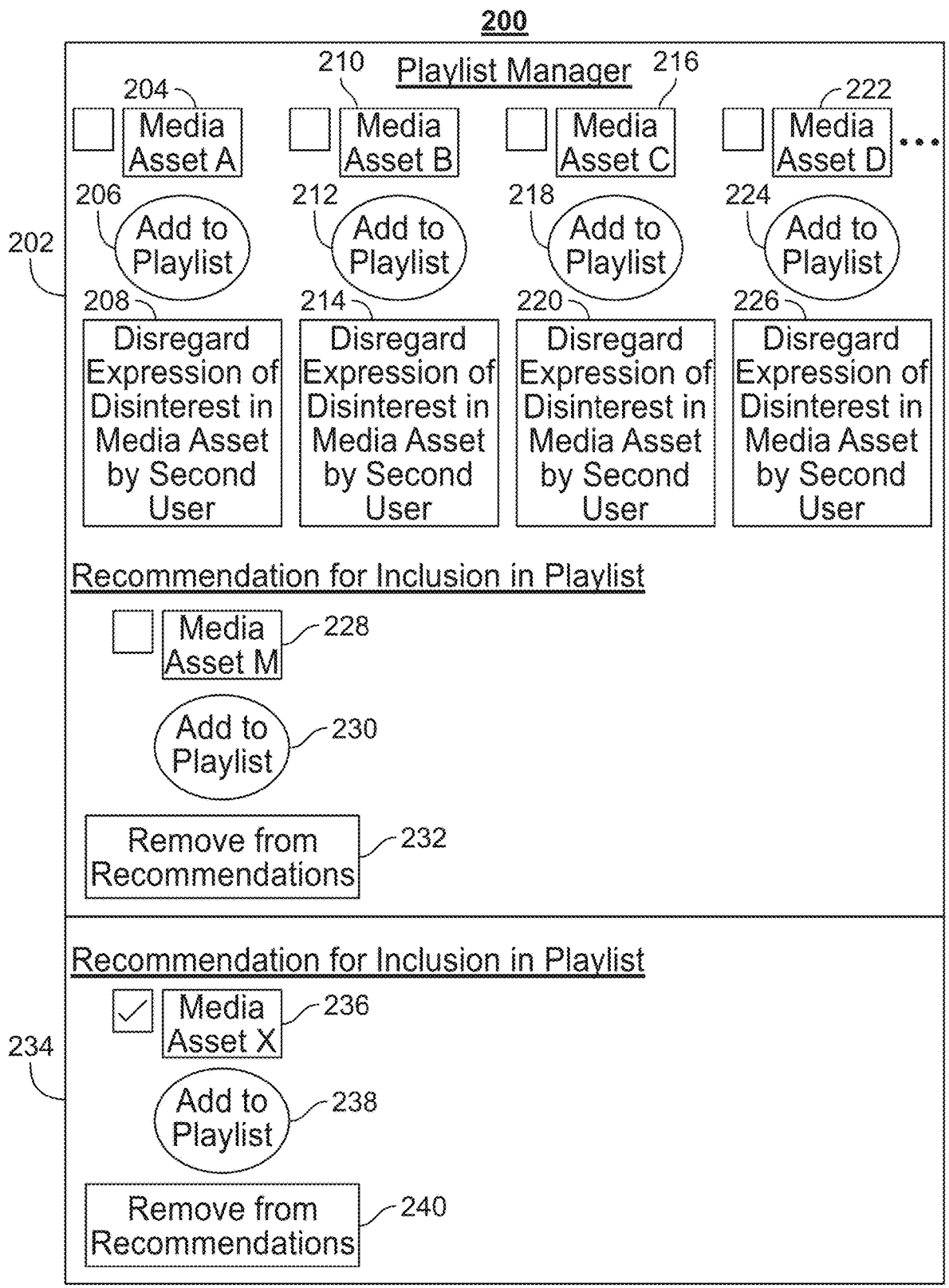
FIG. 2 depicts another illustrative display of the interactive media guidance application in accordance with some embodiments of the disclosure.

FIG. 2 depicts another illustrative display of the interactive media guidance application in accordance with some embodiments of the disclosure. FIG. 2 depicts an illustrative display 200 that may be displayed on any user device (e.g., user television equipment 602, user computer equipment 604, and wireless user communications device 606, described in FIG. 6 below). Control circuitry 504 may cause displays to be displayed on display 512 using the one or more of the processes described in FIGS. 7-10.

Display 200 is an example of a display generated by the interactive media guidance application for the first user. Display 200 may include a variety of displays such as displays 202 and 234. Display 202 is an example of additional selectable options that the interactive media guidance application may provide the first user that will affect the determination of the recommendation for the second media asset. For example, the interactive media guidance application may generate for display a plurality of media asset identifiers such as "Media Asset A" 204, "Media Asset B" 210, "Media Asset C" 216 and "Media Asset D" 222 along with selectable options corresponding to each media asset identifier (e.g., selectable options "Add to playlist" 206 and "Disregard expression of disinterest in media asset by second user" 208 corresponding "Media Asset A" 204; selectable option "Add to playlist" 212 and "Disregard expression of disinterest in media asset by second user" 214 corresponding "Media Asset B" 210; selectable option "Add to playlist" 218 and "Disregard expression of disinterest in media asset by second user" 220 corresponding "Media Asset C" 216; selectable option "add to playlist" 224 and "Disregard expression of disinterest in media asset by second user" 226 corresponding "Media Asset D" 222). Selectable options 208, 214, 220 and 226 allow the first user to indicate media assets to be included in the playlist for the second user for which the expression of disinterest from the second user is to be disregarded. Display 202 may include the media asset identifier "Media asset M" 228 for the second media asset recommended for inclusion in the playlist along with corresponding selectable options. In addition to selectable option "Add to playlist" 230, the interactive media guidance application may provide selectable option "Remove from recommendations" 232 to allow the first user to indicate an expression of disinterest in the recommendation for the second media asset.

In some embodiments, the interactive media guidance application receives, from the first user, a selection of a subset of media assets of the plurality of media assets to be included in the playlist for the second user for which the expression of disinterest from the second user is to be disregarded. For example, the interactive media guidance application may, upon receiving a selection of "Add to playlist" 206, "Add to playlist" 212 and "Add to playlist" 218 via user input interface 510, receive a selection from Mom to include media assets A, B and C in the playlist for Teddy. The interactive media guidance application may also receive, from mom, a selection of "Disregard expression of disinterest in media asset by second user" 208. In some embodiments, the interactive media guidance application, upon receiving the selection of the subset of media assets for the second user for which the expression of disinterest from the second user is to be disregarded, store the media assets identifiers corresponding to the subset of media assets in a data structure (e.g., "disregard list" stored locally in storage 508 or remotely in media content source 616 and media guidance data source 618). For example, the interactive media guidance application may store the media asset identifier for "Media Asset A" 204 in the "disregard list" data structure.

In some embodiments, the interactive media guidance application updating the user profile associated with the second user based on the expression of disinterest in the first media asset further comprises the interactive media guidance application determining whether the first media asset is included in the subset of media assets for which the expression of disinterest from the second user is to be disregarded. For example, the interactive media guidance application, upon receiving the expression of disinterest in the first media asset from the second user, may use a Boolean comparison function to compare the media asset identifier of the first media asset with the media asset identifiers stored in the "disregard list" data structure. The interactive media guidance application may determine that the first media asset is included in the subset of media assets for which the expression of disinterest from the second user is to be disregarded if the Boolean comparison function returns a "true" result. The interactive media guidance application may determine that the first media asset is not included in the subset of media assets for which the expression of disinterest from the second user is to be disregarded if the Boolean comparison function returns a "false" result.

In some embodiments, the interactive media guidance application, in response to determining that the first media asset is included in the subset of media assets for which the expression of disinterest from the second user is to be disregarded, makes no changes to the user profile associated with the second user based on the expression of disinterest in the first media asset. For example, the interactive media guidance application receives an expression of disinterest in the "Media asset A" 204 from the Teddy and the interactive media guidance application determines that "Media asset A" 204 is included in the "disregard list" data structure. In this instance, the interactive media guidance application makes no changes to Teddy's user profile based on the expression of disinterest in "Media asset A" 204. In some embodiments, the interactive media guidance application, in response to determining that the first media asset is not included in the subset of media assets for which the expression of disinterest from the second user is to be disregarded, updates the user profile associated with the second user based on the expression of disinterest in the first media asset. For example, the interactive media guidance application receives an expression of disinterest in the "Media asset B" 210 from Teddy, and the interactive media guidance application determines that "Media asset B" 210 is not included in the "disregard list" data structure. In this instance, the interactive media guidance application updates Teddy's user profile based on the expression of disinterest in media asset B. Techniques by which the interactive media guidance application may update Teddy's user profile based on the expression of disinterest in "Media asset B" 210 discussed previously are applicable here.

In some embodiments, the interactive media guidance application receives, from the first user, an expression of disinterest in the recommendation for the second media asset. For example, the interactive media guidance application may receive an expression of disinterest in "Media asset M" 228 from Mom upon receiving a selection of the "Remove from playlist" 232 option via user input interface 510. In some embodiments, the interactive media guidance application, in response to receiving the expression of disinterest in the recommendation for the second media asset, updates the user profile associated with the second user based on the expression of disinterest in the recommendation. For example, the interactive media guidance application may update Teddy's user profile based on the request from Mom to remove "Media asset M" 232 from the recommendations. Techniques by which the interactive media guidance application may update the user profile associated with the second user based discussed previously are applicable here. The interactive media guidance application may determine a recommendation for a third media asset for inclusion in the playlist for the second user based on the updated user profile associated with the second user. Manner in which the interactive media guidance application performs this determination discussed previously are applicable here. The interactive media guidance application may generate for display, for the first user, the recommendation for the third media asset. Display 234 is an example of display that the interactive media guidance application may generate for recommending the third media asset. For example, upon determining that media asset X should be recommended for inclusion the playlist for Teddy, the interactive media guidance application may include media asset identifier "Media asset X" 236 along with selectable options "Add to playlist" 238 and "Remove from Recommendations" 240 in display 234.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 3:
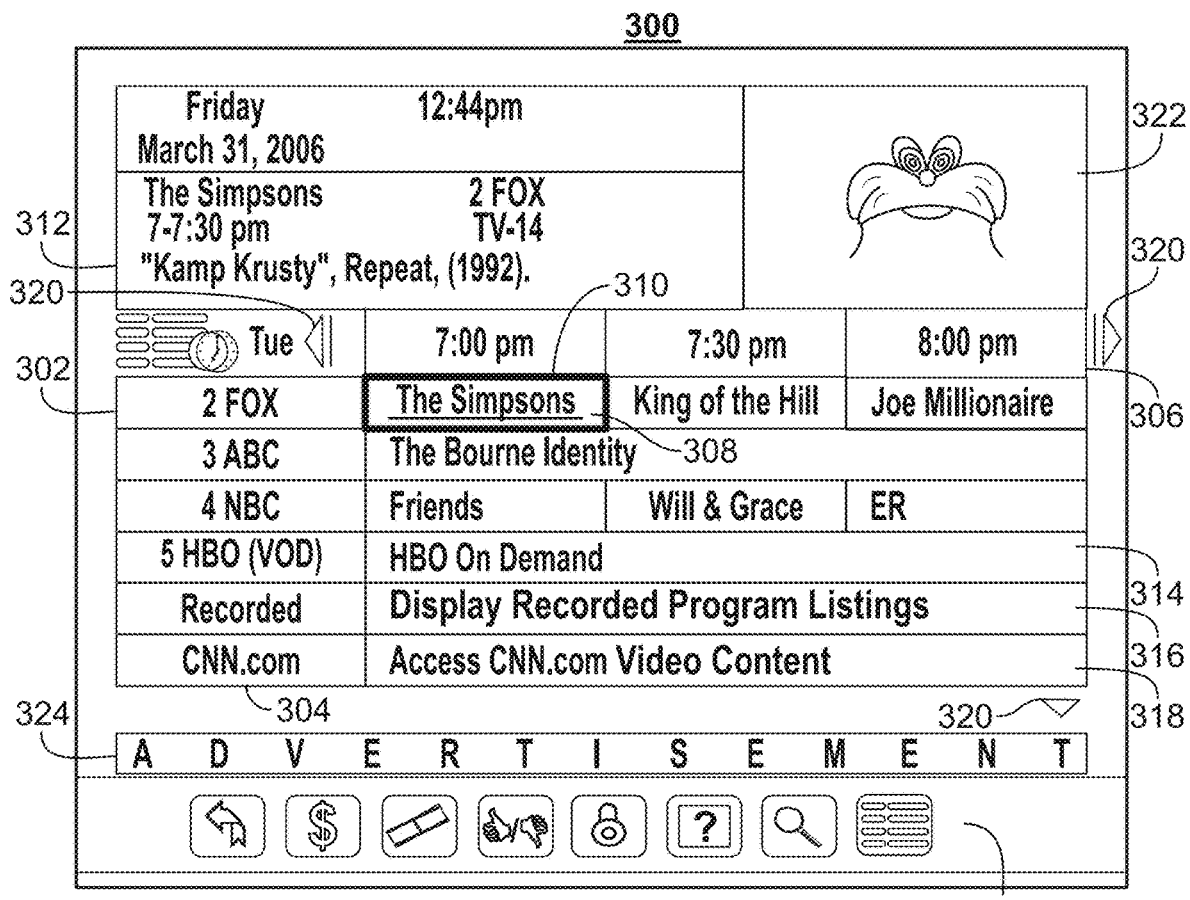
FIG. 3 shows an illustrative embodiment of a display screen that may be used to provide media guidance application listings and other media guidance information, in accordance with some embodiments of the disclosure.
Figure 4:
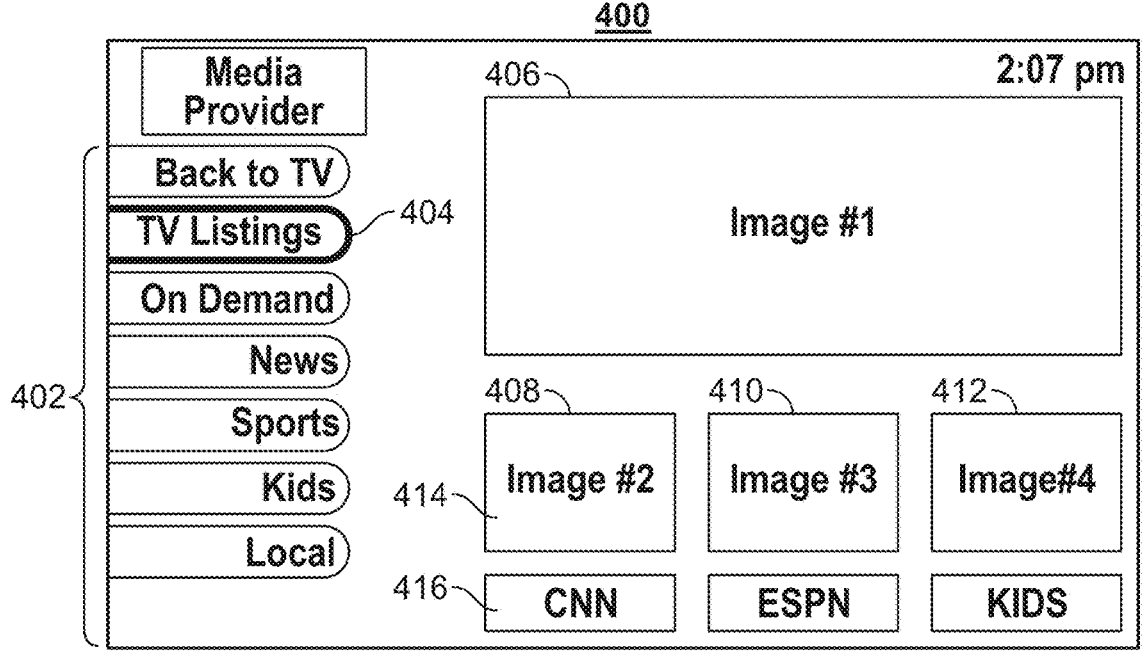
FIG. 4 shows another illustrative embodiment of a display screen that may be used to provide media guidance application listings, in accordance with some embodiments of the disclosure.

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, advertisement 324, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 324 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 302. Advertisement 324 may also be for products or services related or unrelated to the content displayed in grid 302. Advertisement 324 may be selectable and provide further information about content, provide information about a product or a service, enable purchasing of content, a product, or a service, provide content relating to the advertisement, etc. Advertisement 324 may be targeted based on a user's profile/preferences, monitored user activity, the type of display provided, or on other suitable targeted advertisement bases.

While advertisement 324 is shown as rectangular or banner shaped, advertisements may be provided in any suitable size, shape, and location in a guidance application display. For example, advertisement 324 may be provided as a rectangular shape that is horizontally adjacent to grid 302. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
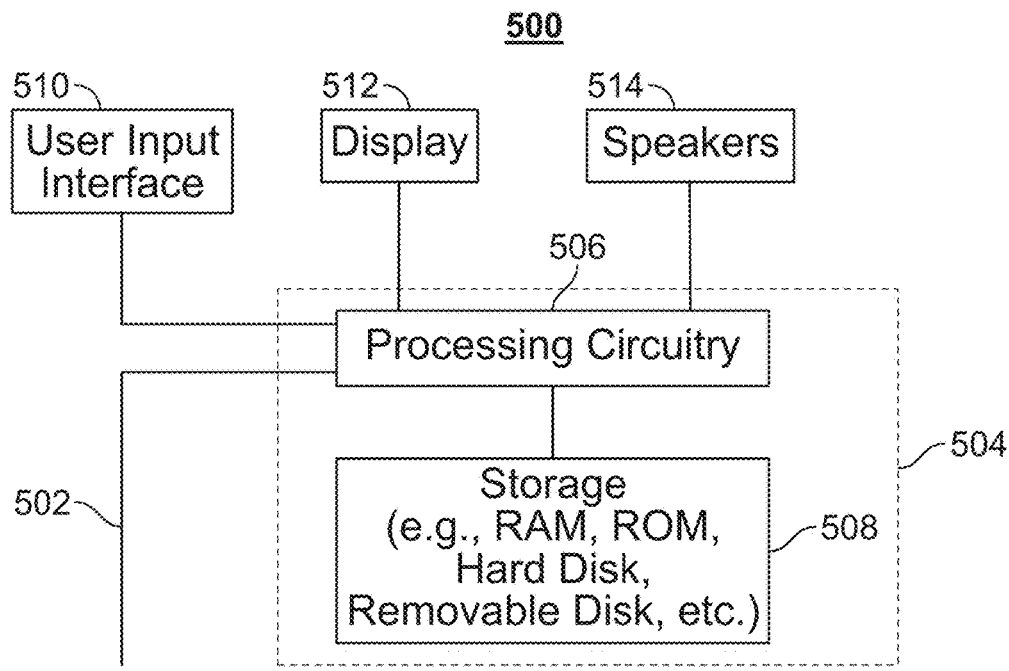
FIG. 5 is a block diagram of an illustrative user equipment (UE) device in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
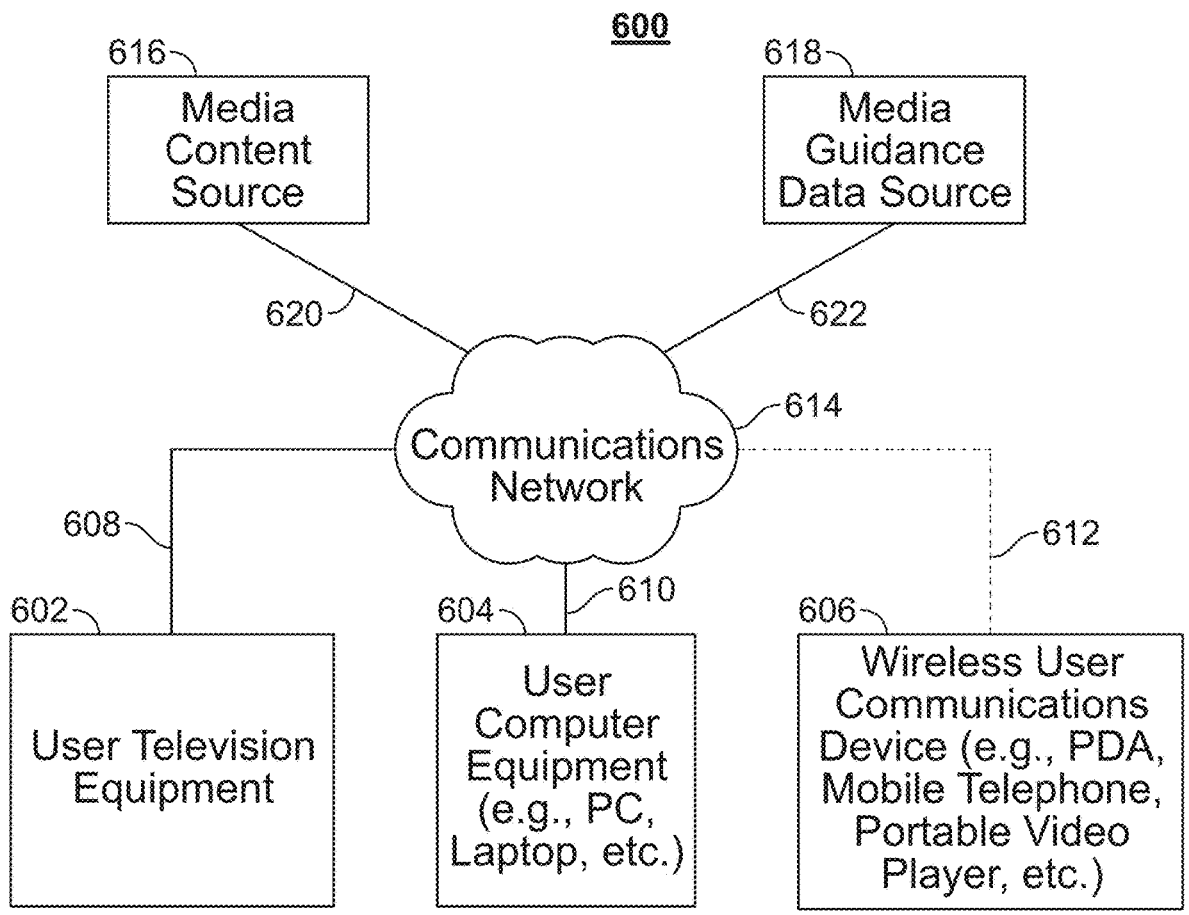
FIG. 6 is a block diagram of an illustrative media system in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some user television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 7:
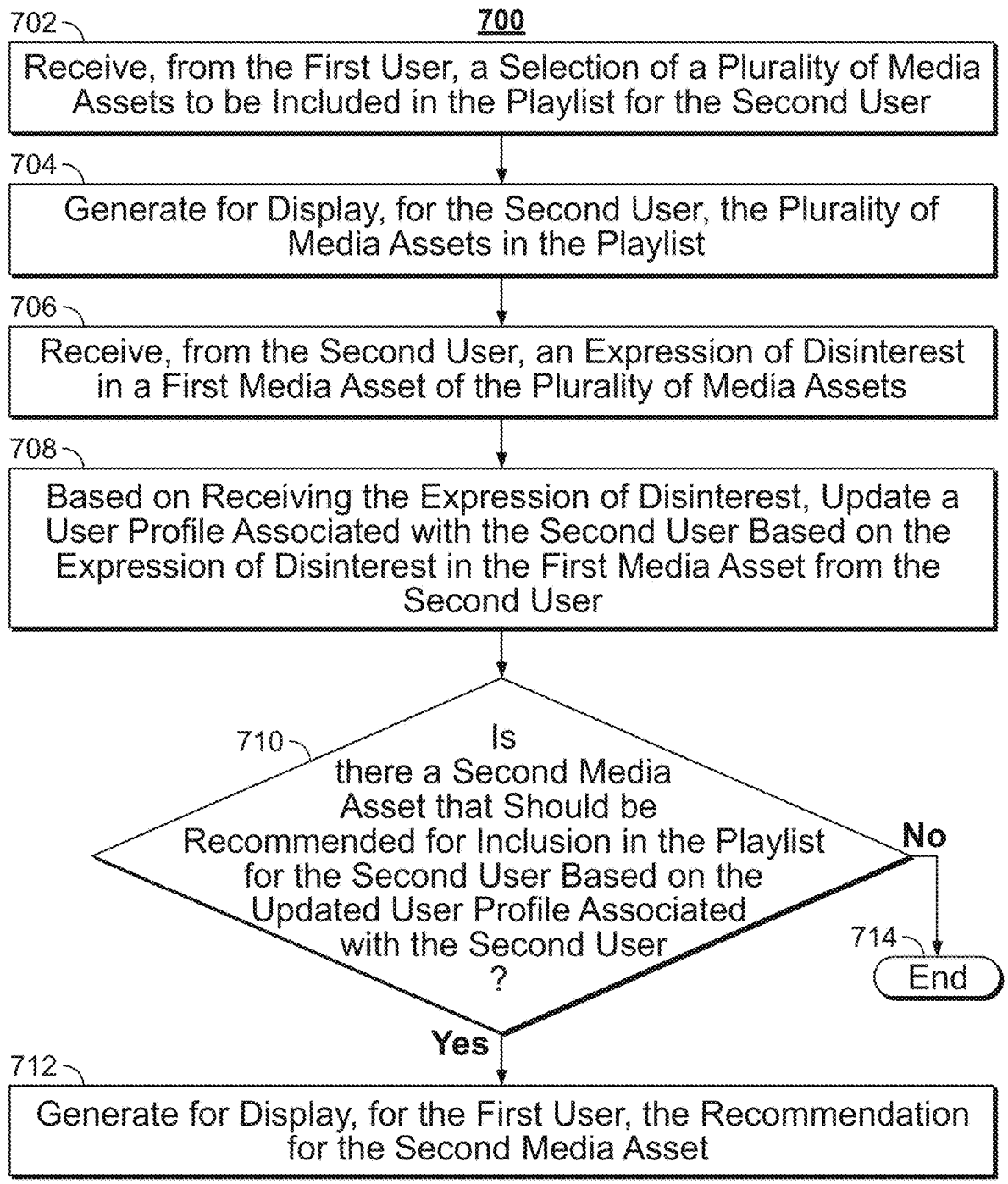
FIG. 7 is a flowchart of illustrative steps involved in providing a first user with recommendations of media assets for inclusion in a playlist for a second user based on the second user's viewing activity in accordance with some embodiments of the disclosure.

FIG. 7 is a flowchart of illustrative steps involved in providing a first user with recommendations of media assets for inclusion in a playlist for a second user based on the second user's viewing activity in accordance with some embodiments of the disclosure. It should be noted that process 700 or any step thereof could be performed on, or provided by, any of the devices shown in FIGS. 5-6. For example, process 700 may be executed by control circuitry 504 (FIG. 5) as instructed by the interactive media guidance application implemented on user equipment 602, 604, and/or 606 (FIG. 6). In addition, one or more steps of process 700 may be incorporated into or combined with one or more steps of any other process or embodiment.

Process 700 begins at 702, where control circuitry 504 receives, from the first user, a selection of a plurality of media assets to be included in the playlist for the second user. For example, control circuitry 504 may receive from Mom a selection to include "Media Asset A" 104, "Media Asset B" 108 and "Media Asset C" 112 in the playlist upon receiving a selection of the options "add to playlist" 106, "add to playlist" 110, "add to playlist" 114 via user input interface 510. Process 700 continues to 704, where control circuitry 504 generates for display, for the second user, the plurality of media assets in the playlist. For example, the control circuitry 504 may generate for display media asset identifiers for the plurality of media assets selected by the first user (e.g., "Media Asset A" 122, "Media Asset B" 134 and "Media Asset C" 146) along with corresponding selectable options.

Process 700 continues to 706, where control circuitry 504 receives, from the second user, an expression of disinterest in a first media asset of the plurality of media assets. For example, control circuitry 504 may receive, from Teddy, an expression of disinterest in "Media asset A" 122 upon receiving a selection of "Remove from playlist" 126 option prior to receiving any selection of "Play" 124 option. Process 700 continues to 708, where control circuitry 504, based on receiving the expression of disinterest, updates a user profile associated with the second user based on the expression of disinterest in the first media asset from the second user. For example, control circuitry 504 may update Teddy's user profile (stored locally in storage 508 or remotely in media content source 616 and media guidance data source 618) based on the request to remove "Media asset A" 122 from the playlist. Techniques by which control circuitry 504 may perform this update discussed previously are applicable here.

Process 700 continues to 710 where control circuitry 504 determines whether there is a second media asset that should be recommended for inclusion in the playlist for the second user based on the updated user profile associated with the second user. Techniques by which control circuitry 504 may perform this determination discussed previously are applicable here. If, at 710, control circuitry 504 determines that there is a second media asset that should be recommended for inclusion in the playlist for the second user based on the updated user profile associated with the second user, process 700 continues to 712. At 712, control circuitry 504 generates for display, for the first user, the recommendation for the second media asset. For example, control circuitry 504 may determine that media asset M should be recommended to Mom for inclusion in the playlist for Teddy. In this case, control circuitry 504 may generate for display 164, which includes media asset identifier for the second media asset "Media asset M" 166 and selectable option "Add to Playlist" 168 to allow Mom to include "Media asset M" 166 in the playlist for Teddy. If, at 710, control circuitry 504 determines that there isn't a second media asset that should be recommended for inclusion in the playlist for the second user based on the updated user profile associated with the second user, process 700 continues to 714. At 714, process 700 terminates.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method.

Figure 8:
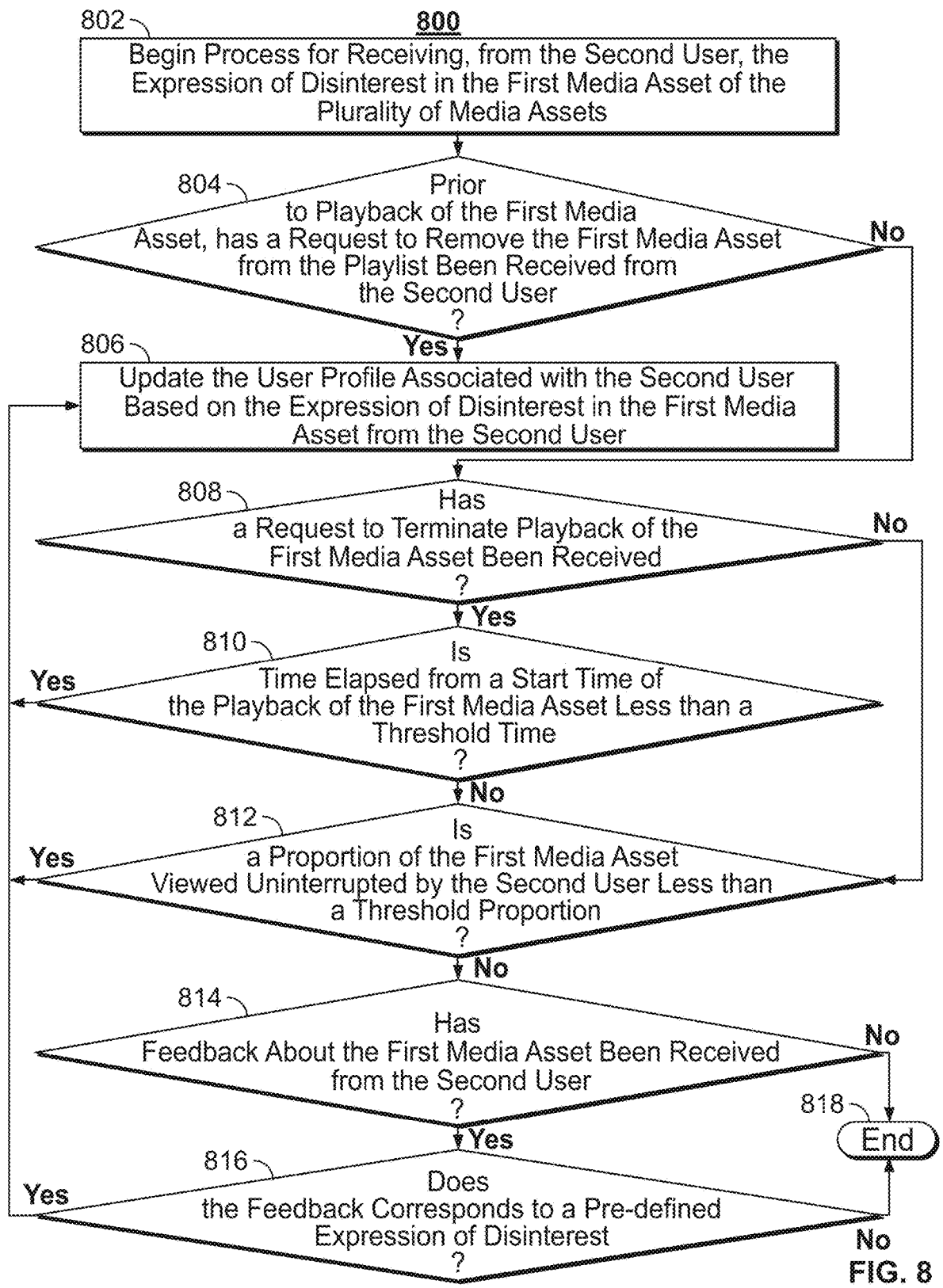
FIG. 8 is a flowchart of illustrative steps involved in step 706 (FIG. 7) when receiving, from the second user, the expression of disinterest in the first media asset of the plurality of media assets in accordance with some embodiments of the disclosure.

FIG. 8 is a flowchart of illustrative steps involved in step 706 (FIG. 7) when receiving, from the second user, the expression of disinterest in the first media asset of the plurality of media assets in accordance with some embodiments of the disclosure. It should be noted that process 800 or any step thereof could be performed on, or provided by, any of the devices shown in FIGS. 5-6. For example, process 700 may be executed by control circuitry 504 (FIG. 5) as instructed by the interactive media guidance application implemented on user equipment 602, 604, and/or 606 (FIG. 6). In addition, one or more steps of process 700 may be incorporated into or combined with one or more steps of any other process or embodiment.

Process 800 begins at 802, where control circuitry 504 begins the process for receiving, from the second user, the expression of disinterest in the first media asset of the plurality of media assets. Process 800 continues to 804 where control circuitry 504 determines whether, prior to playback of the first media asset, a request to remove the first media asset from the playlist has been received from the second user. For example, control circuitry 504 determines whether a selection of "Remove from play list" 126 options has been received prior to any selection of "Play" 124 option. If, at 804, control circuitry 504 determines that, prior to playback of the first media asset, a request to remove the first media asset from the playlist has been received from the second user, process 800 continues to 806. At 806, control circuitry 504 updates the user profile associated with the second user based on the expression of disinterest in the first media asset from the second user. For example, control circuitry 504 updates Teddy's user profile based on the expression of disinterest in "Media asset A" 122.

If, at 804, control circuitry 504 determines that, prior to playback of the first media asset, a request to remove the first media asset from the play list has not been received from the second user, process 800 continues to 808. At 808, control circuitry 504 determines whether a request to terminate playback of the first media asset has been received. If, at 808, control circuitry 504 determines that a request to terminate playback of the first media asset has been received, process 800 continues to 810. At 810, control circuitry 504 determines whether the time elapsed from a start time of the playback of the first media asset is less than a threshold time. For example, control circuitry 504 may access a data structure (e.g., threshold parameters data structure stored locally in storage 508 or remotely in media content source 616 and media guidance data source 618) associated with Teddy's user profile or a separate data structure to determine the value of the threshold time. Techniques by which control circuitry 504 may perform the determination discussed previously are applicable here.

If, at 810, control circuitry 504 determines that the time elapsed from a start time of the playback of the first media asset is less than a threshold time, process 800 reverts to 806 where control circuitry 504 updates the user profile associated with the second user based on the expression of disinterest in the first media asset from the second user. For example, control circuitry 504 receives, from Teddy, a selection of a termination option five minutes after a selection of "Play" 124 option. If the threshold time is ten minutes, control circuitry 504 determines that it has received the expression of disinterest in "Media asset A" 122 from Teddy. If, at 810, control circuitry 504 determines that the time elapsed from a start time of the playback of the first media asset is not less than a threshold time, process 800 continues to 812. Similarly if, at 808, control circuitry 504 determines that a request to terminate playback of the first media asset has not been received, process 800 continues to 812.

At 812, control circuitry 504 determines whether a proportion of the first media asset viewed uninterrupted by the second user is less than a threshold proportion. If, at 812, control circuitry 504 determines that the proportion of the first media asset viewed uninterrupted by the second user is less than the threshold proportion, process 800 reverts to 806. For example, the threshold proportion may be 50%. If Teddy fast-forwards through 65% of "Media asset A" 122, control circuitry 504 determines that the proportion of "Media asset A" 122 viewed uninterrupted is 35%. In this case, control circuitry 504 determines that the interactive media guidance application has received the expression of disinterest in "Media asset A" 122 from Teddy. At 806, control circuitry 504 updates the user profile associated with the second user based on the expression of disinterest in the first media asset from the second user. In this case, control circuitry 504 updates Teddy's user profile based on the expression of disinterest in "Media asset A" 122. If, at 812, control circuitry 504 determines that the proportion of the first media asset viewed uninterrupted by the second user is not less than the threshold proportion, process 800 continues to 814.

At 814, control circuitry 504 determines whether a feedback about the first media asset been received from the second user. For example, control circuitry 504 determines whether a selection of any of "Rate this media asset" 128, "Dislike" 132 and "Leave comments" 158 has been received. If, at 814, control circuitry 504 determines that a feedback about the first media asset has been received from the second user, process 800 continues to 816. For example, control circuitry 504 receives a selection of "Dislike" 132 option. At 816, control circuitry 504 determines whether the feedback corresponds to a pre-defined expression of disinterest. For example, control circuitry 504 accesses a data structure (e.g., threshold parameters data structure stored locally in storage 508 or remotely in media content source 616 and media guidance data source 618) associated with Teddy's user profile or a separate data structure to determine whether selection of "Dislike" 132 option is a pre-defined expression of disinterest. Techniques by which control circuitry 504 may perform this determination described previously are applicable here. If, at 816, control circuitry 504 determines that the feedback corresponds to a pre-defined expression of disinterest, process 800 reverts to 806. At 806, control circuitry 504 updates the user profile associated with the second user based on the expression of disinterest in the first media asset from the second user. If, at 816, control circuitry 504 determines that the feedback does not correspond to a pre-defined expression of disinterest, process 800 continues to 818. Similarly if, at 814, control circuitry 504 determines that a feedback about the first media asset has not been received from the second user, process 800 continues to 818. At 818, process 800 terminates.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method.

Figure 9:
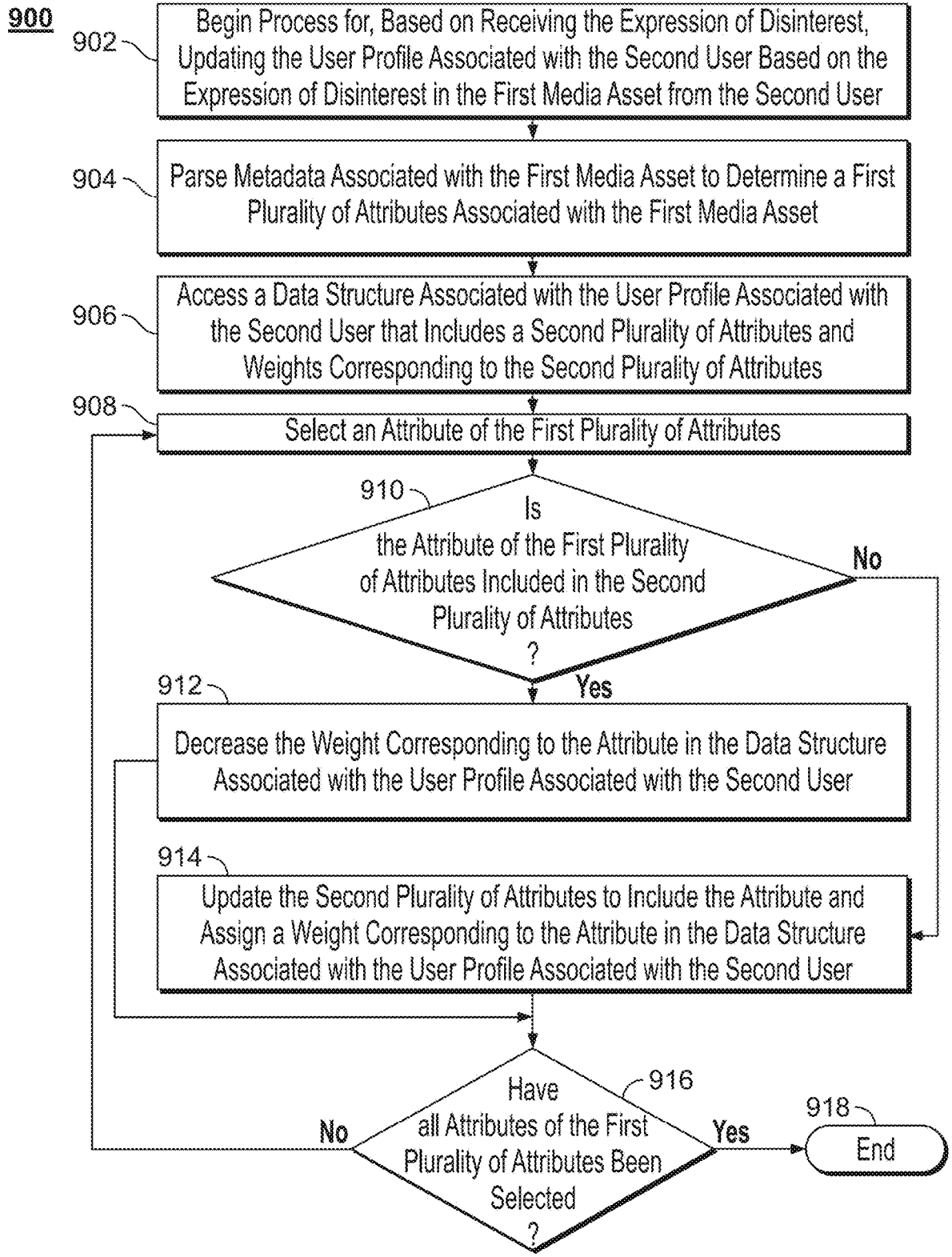
FIG. 9 is a flowchart of illustrative steps involved in step 708 (FIG. 7) when updating the user profile associated with the second user based on the expression of disinterest in the first media asset from the second user in accordance with some embodiments of the disclosure.

FIG. 9 is a flowchart of illustrative steps involved in step 708 (FIG. 7) when updating the user profile associated with the second user based on the expression of disinterest in the first media asset from the second user in accordance with some embodiments of the disclosure. It should be noted that process 900 or any step thereof could be performed on, or provided by, any of the devices shown in FIGS. 5-6. For example, process 900 may be executed by control circuitry 504 (FIG. 5) as instructed by the interactive media guidance application implemented on user equipment 602, 604, and/or 606 (FIG. 6). In addition, one or more steps of process 700 may be incorporated into or combined with one or more steps of any other process or embodiment.

Process 900 begins at 902, where control circuitry 504 begins process for, based on receiving the expression of disinterest, updating the user profile associated with the second user based on the expression of disinterest in the first media asset from the second user. Process 900 continues to 904 where control circuitry 504 parses metadata associated with the first media asset to determine a first plurality of attributes. For example, control circuitry 504 retrieves metadata corresponding to the first media asset by querying a database (e.g., a content listings database of the content source providing media asset A located at media content source 616 and media guidance data source 618) for the metadata corresponding to "Media asset A" 122. Control circuitry 504 may parse the metadata associated with "Media asset A" 122 to determine that "Media asset A" 122 has the attributes science fiction, Walt Disney Studios and plot x. Process 900 continues to 906 where control circuitry 504 accesses a data structure associated with the user profile associated with the second user that includes a second plurality of attributes and weights corresponding to the second plurality of attributes. For example, control circuitry 504 accesses an attributes data structure in Teddy's user profile, which includes the attributes animation, science fiction, Walt Disney Studios, plot x and plot y with corresponding weights of 3, 1, 3, 2, and 1.

Process 900 continues to 908 where control circuitry 504 selects an attribute of the first plurality of attributes. For example, control circuitry 504 selects science fiction. Process 900 continues to 910 where control circuitry 504 determines whether the attribute of the first plurality of attributes is included in the second plurality of attributes. If, at 910, control circuitry 504 determines that the attribute of the first plurality of attributes is included in the second plurality of attributes, process 900 continues to 912. At 912, control circuitry 504 decreases the weight corresponding to the attribute in the data structure associated with the user profile associated with the second user. For example, control circuitry 504 decreases the weight corresponding to science fiction in the attributes data structure to 0. Process 900 continues to 916 where control circuitry 504 determines if all attributes of the first plurality of attributes have been selected. For example, control circuitry 504 determines whether all three attributes of "Media asset A" 122 (i.e., science fiction, Walt Disney Studios and plot x) have been selected.

If, at 916, control circuitry 504 determines that all attributes of the first plurality of attributes have not been selected, process 900 reverts to 908. At 908, control circuitry 504 selects an attribute of the first plurality of attributes. If, at 916, control circuitry 504 determines that all attributes of the first plurality of attributes have been selected, process 900 continues to 918. At 918, process 900 terminates. If, at 910, control circuitry 504 determines that the attribute of the first plurality of attributes is not included in the second plurality of attributes, process 900 continues to 914.

At 914, control circuitry 504 updates the second plurality of attributes to include the attribute and assign a weight corresponding to the attribute in the data structure associated with the user profile associated with the second user. Process 900 continues to 916 where control circuitry 504 determines if all attributes of the first plurality of attributes have been selected. If, at 916, control circuitry 504 determines that all attributes of the first plurality of attributes have not been selected, process 900 reverts to 908. At 908, control circuitry 504 selects an attribute of the first plurality of attributes. If, at 916, control circuitry 504 determines that all attributes of the first plurality of attributes have been selected, process 900 continues to 918. At 918, process 900 terminates.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method.

Figure 10:
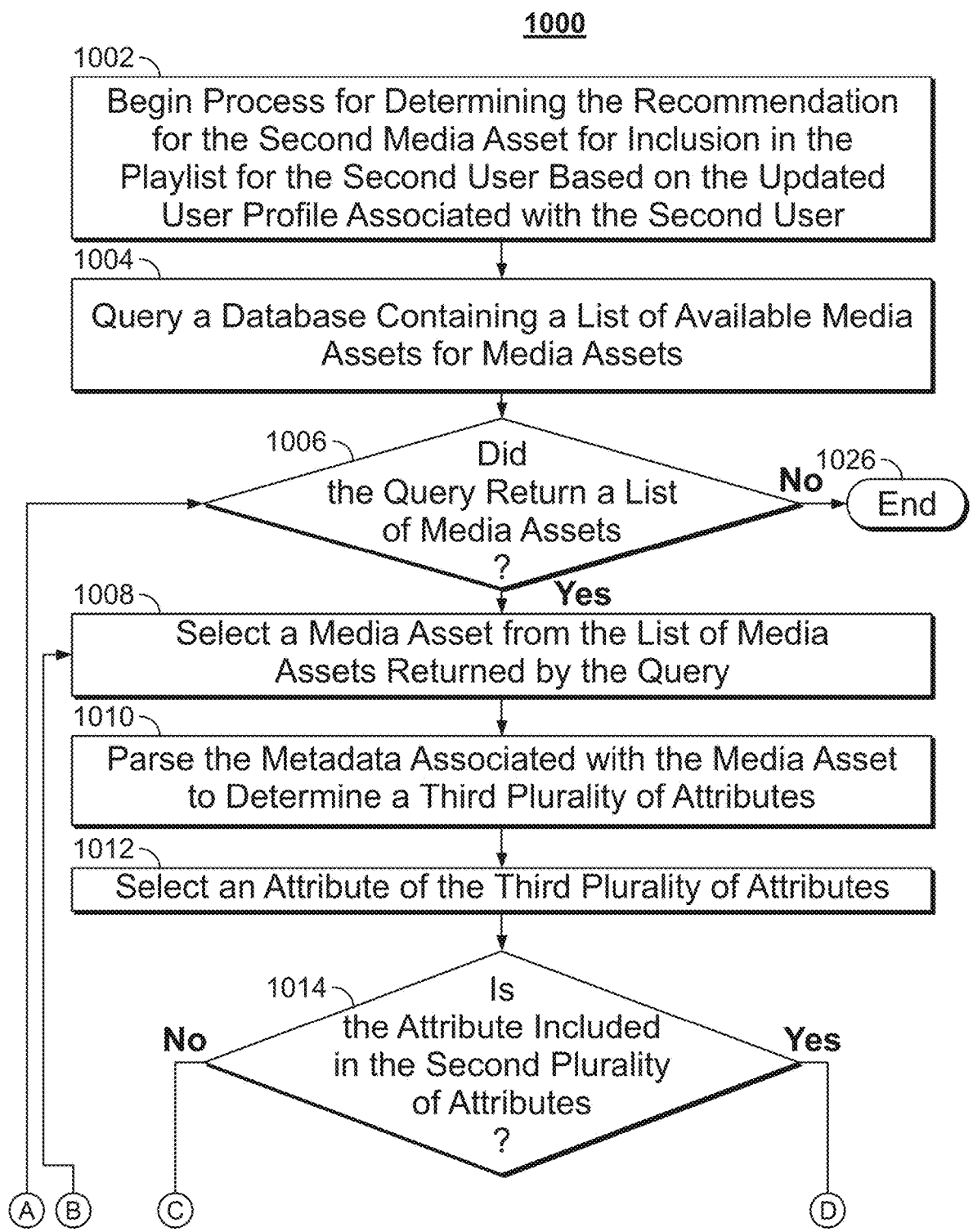
FIG. 10 is a flowchart of illustrative steps involved in step 710 (FIG. 7) when determining the recommendation for the second media asset for inclusion in the playlist for the second user based on the updated user profile associated with the second user in accordance with some embodiments of the disclosure.
Figure 10:
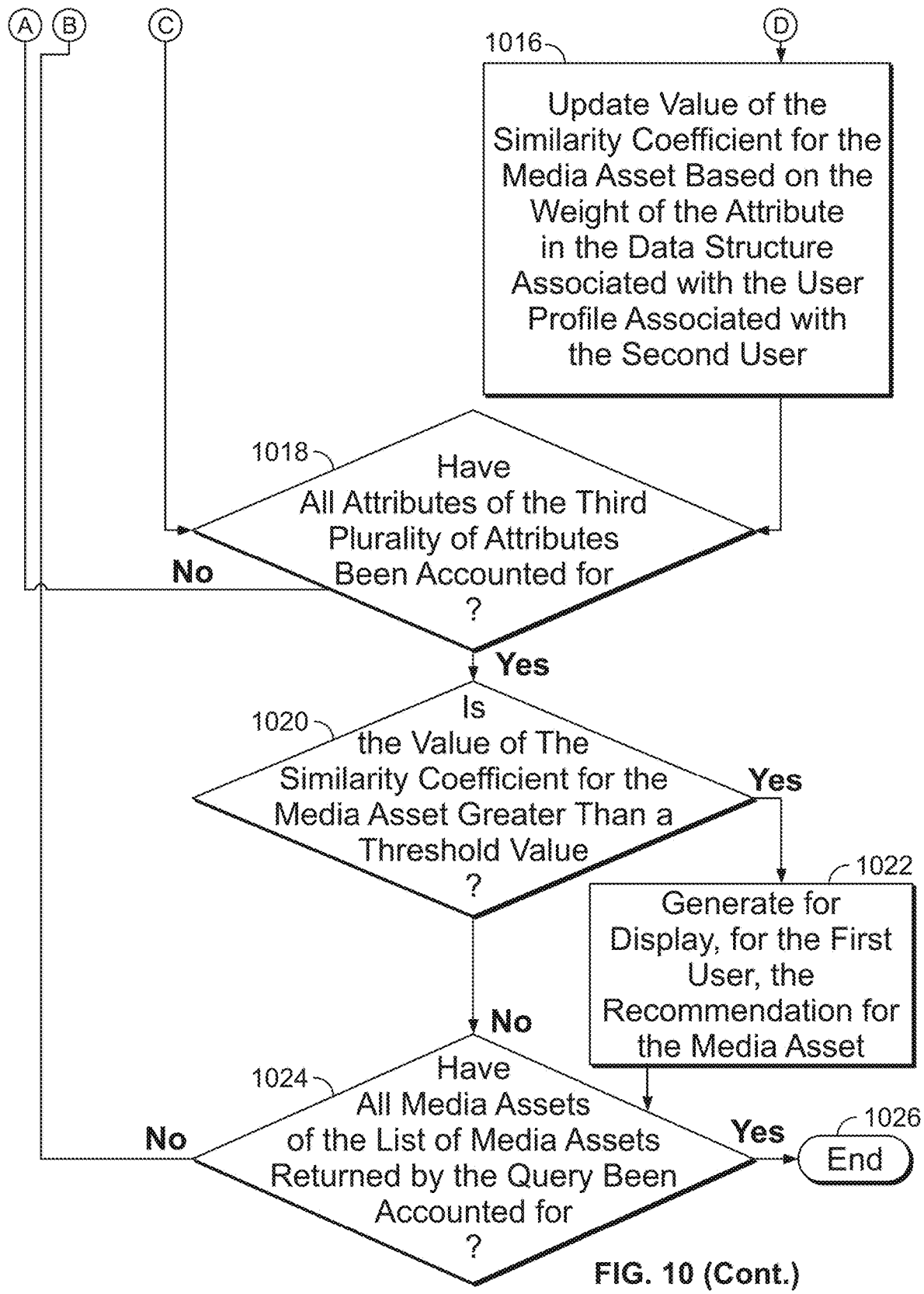

FIG. 10 is a flowchart of illustrative steps involved in step 710 (FIG. 7) when determining the recommendation for the second media asset for inclusion in the playlist for the second user based on the updated user profile associated with the second user in accordance with some embodiments of the disclosure. It should be noted that process 1000 or any step thereof could be performed on, or provided by, any of the devices shown in FIGS. 5-6. For example, process 1000 may be executed by control circuitry 504 (FIG. 5) as instructed by the interactive media guidance application implemented on user equipment 602, 604, and/or 606 (FIG. 6). In addition, one or more steps of process 700 may be incorporated into or combined with one or more steps of any other process or embodiment.

Process 1000 begins at 1002, where control circuitry 504 begins process for determining the recommendation for the second media asset for inclusion in the playlist for the second user based on the updated user profile associated with the second user. Process 1000 continues to 1004 where control circuitry 504 queries a database containing a list of available media assets for media assets. For example, control circuitry 504 may query a content listings database located at media content source 616 and media guidance data source 618 for media assets suitable for the age of the second user. Process 1000 continues to 1006 where control circuitry 504 determines whether the query returned a list of media assets. If, at 1006, control circuitry 504 determines that the query did not return a list of media assets, process 1000 continues to 1026. At 1026, process 1000 terminates. If, at 1006, control circuitry 504 determines that the query returns a list of media assets, process 1000 continues to 1008.

At 1008, control circuitry 504 selects a media asset from the list of media assets returned by the query. For example, the query has returned "Media asset M" 166. Process 1000 continues to 1010 where control circuitry 504 parses the metadata associated with the media asset to determine a third plurality of attributes. For example, control circuitry 504 may determine that "Media asset M" 166 has attributes animation and Walt Disney Studios. Process 1000 continues to 1012, where control circuitry 504 selects an attribute of the third plurality of attributes. For example, control circuitry 504 may select the animation attribute. Process 1000 continues to 1014, where control circuitry 504 determines whether the attribute is included in the second plurality of attributes. If, at 1014, control circuitry 504 determines that the attribute is included in the second plurality of attributes, process 1000 continues to 1016. At 1016, control circuitry 504 updates the value of the similarity coefficient for the media asset based on the weight of the attribute in the data structure associated with the user profile associated with the second user. For example, control circuitry 504 determines that the animation is included in the attributes data structure in Teddy's user profile and the weight corresponding to it is 3. Control circuitry 504 may then add 3 to the current value of the similarity coefficient for the media asset "Media asset M" 166.

Process 1000 continues to 1018. If, at 1014, control circuitry 504 determines that the attribute is not included in the second plurality of attributes, process 1000 continues to 1018. At 1018, control circuitry 504 determines whether all attributes of the third plurality of attributes have been accounted for. If, at 1018, control circuitry 504 determines that all attributes of the third plurality of attributes have not been accounted for, process 1000 reverts to 1012 where control circuitry 504 selects an attribute of the third plurality of attributes. If, at 1018, control circuitry 504 determines that all attributes of the third plurality of attributes have been accounted for, process 1000 continues to 1020. At 1020, control circuitry 504 determines whether the value of the similarity coefficient for the media asset is greater than a threshold value. Manners in which control circuitry 504 performs this determination discussed previously are applicable here.

If, at 1020, control circuitry 504 determines that the value of the similarity coefficient for the media asset is greater than a threshold value, process 1000 continues to 1022. At 1022, control circuitry 504 generates for display, for the first user, the recommendation for the media asset. For example, control circuitry 504 may determine that the similarity coefficient for "Media asset M" 166 is greater than a threshold value and generate for display for the first user display 164. Process 1000 continues to 1024. If, at 1020, control circuitry 504 determines that the value of the similarity coefficient for the media asset is not greater than the threshold value, process 1000 continues to 1024. At 1024, control circuitry 504 determines whether all media assets of the list of media assets returned by the query have been accounted for.

If, at 1024, control circuitry 504 determines that all media assets of the list of media assets returned by the query have not been accounted for, process 1000 reverts to 1008 where control circuitry 504 selects a media asset from the list of media assets returned by the query. If, at 1024, control circuitry 504 determines that all media assets of the list of media assets returned by the query have been accounted for, process 1000 continues to 1026. At 1026, process 1000 terminates.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for recommending media assets to a first user for including in a playlist for a second user, the method comprising:
    receiving, from the second user, an expression of disinterest in a first media asset having a first plurality of content attributes;
    determining whether a number of expressions of disinterest that have been received from the second user during a period of time exceeds a threshold number of expressions of disinterest;
    in response to determining that the number of expressions of disinterest that have been received from the second user during the period of time does not exceed the threshold, decreasing a weight associated with at least one content attribute, wherein each weight of a plurality of weights is associated with a respective content attribute of a second plurality of content attributes;

determining, based on the decreased weight, a second media asset for recommendation to the first user for including in the playlist; and generating for display, to the first user, a recommendation for the second media asset for including in the playlist.

2. The method of claim 1, further comprising:

receiving, from the second user, an expression of disinterest in the recommendation for the second media asset; and in response to receiving the expression of disinterest in the recommendation for the second media asset:
updating a user profile associated with the second user based on the expression of disinterest in the recommendation;
determining a recommendation for a third media asset for inclusion in the playlist for the first user based on the updated user profile associated with the second user; and
generating for display the recommendation for the third media asset.

3. The method of claim 1, wherein receiving the expression of disinterest in the first media asset comprises receiving a request from the second user to remove the first media asset from the playlist prior to playback of the first media asset.

4. The method of claim 1, wherein receiving the expression of disinterest in the first media asset comprises receiving a request to terminate playback of the first media asset before a threshold time has elapsed from a start time of the playback of the first media asset.

5. The method of claim 1, wherein receiving the expression of disinterest in the first media asset comprises determining that a proportion of the first media asset viewed uninterrupted by the second user is less than a threshold proportion.

6. The method of claim 1, wherein receiving the expression of disinterest in the first media asset comprises:
receiving a feedback about the first media asset from the second user; and
determining that the feedback corresponds to a pre-defined expression of disinterest.

7. The method of claim 1, wherein a user profile associated with the second user includes a plurality of attribute types and corresponding weights, wherein the corresponding weights are initialized to default values based on an age of the second user.

8. The method of claim 1, further comprising receiving, from the second user, selection of a plurality of media assets to be included in the playlist for the first user.

9. The method of claim 8, further comprising generating for display, for the second user, representations of the plurality of media assets to be included in the playlist for the first user.

10. The method of claim 8, wherein receiving, from the second user, selection of the plurality of media assets to be included in the playlist for the first user further comprises receiving, from the second user, a selection of a subset of media assets of a plurality of media assets for which the respective number of expressions of disinterest received from the second user does not exceed the threshold.

11. A system for recommending media assets to a first user for including in a playlist for a second user, the system comprising:
input circuitry; and
control circuitry configured to:
receive, from the second user, using the input circuitry, an expression of disinterest in a first media asset having a first plurality of content attributes;
determining whether a number of expressions of disinterest that have been received from the second user during a period of time exceeds a threshold number of expressions of disinterest;
in response to determining that the number of expressions of disinterest that have been received from the second user during the period of time does not exceed the threshold, decreasing a weight associated with at least one content attribute, wherein each weight of a plurality of weights is associated with a respective content attribute of a second plurality of content attributes;
determining, based on the decreased weight, a second media asset for recommendation to the first user for including in the playlist; and
generating for display, to the first user, a recommendation for the second media asset for including in the playlist.

12. The system of claim 11, wherein the control circuitry is further configured to:
receive, from the second user, an expression of disinterest in the recommendation for the second media asset; and
in response to receiving the expression of disinterest in the recommendation for the second media asset:
update a user profile associated with the second user based on the expression of disinterest in the recommendation;
determine a recommendation for a third media asset for inclusion in the playlist for the first user based on the updated user profile associated with the second user; and
generate for display the recommendation for the third media asset.

13. The system of claim 11, wherein the control circuitry configured to receive, using the input circuitry, the expression of disinterest in the first media asset is further configured to receive, using the input circuitry, a request from the second user to remove the first media asset from the playlist prior to playback of the first media asset.

14. The system of claim 11, wherein the control circuitry configured to receive, using the input circuitry, the expression of disinterest in the first media asset is further configured to receive, using the input circuitry, a request to terminate playback of the first media asset before a threshold time has elapsed from a start time of the playback of the first media asset.

15. The system of claim 11, wherein the control circuitry configured to receive, using the input circuitry, the expression of disinterest in the first media asset is further configured to determine that a proportion of the first media asset viewed uninterrupted by the second user is less than a threshold proportion.

16. The system of claim 11, wherein the control circuitry configured to receive, using the input circuitry, the expression of disinterest in the first media asset is further configured to:
receive, using the input circuitry, a feedback about the first media asset from the second user; and
determine that the feedback corresponds to a pre-defined expression of disinterest.

17. The system of claim 11, wherein a user profile associated with the second user includes a plurality of attribute types and corresponding weights, wherein the corresponding weights are initialized to default values based on an age of the second user.

18. The system of claim 11, wherein the control circuitry is further configured to receive, from the second user, using the input circuitry, selection of a plurality of media assets to be included in the playlist for the first user.

19. The system of claim 18, wherein the control circuitry is further configured to generate for display, for the second user, representations of the plurality of media assets to be included in the playlist for the first user.

20. The system of claim 18, wherein the control circuitry configured to receive, from the second user, using the input circuitry, selection of the plurality of media assets to be included in the playlist for the first user is further configured to receive, from the second user, using the input circuitry, a selection of a subset of media assets of a plurality of media assets for which the respective number of expressions of disinterest received from the second user does not exceed the threshold.

* * * * *